US010080185B2

(12) United States Patent
Escott et al.

(10) Patent No.: US 10,080,185 B2
(45) Date of Patent: Sep. 18, 2018

(54) METHOD AND APPARATUS FOR SECURING STRUCTURED PROXIMITY SERVICE CODES FOR RESTRICTED DISCOVERY

(71) Applicant: QUALCOMM Incorporated, San Diego, CA (US)

(72) Inventors: Adrian Edward Escott, Reading (GB); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/076,087

(22) Filed: Mar. 21, 2016

(65) Prior Publication Data

US 2016/0302137 A1    Oct. 13, 2016

Related U.S. Application Data

(60) Provisional application No. 62/146,170, filed on Apr. 10, 2015.

(51) Int. Cl.
*H04W 48/16* (2009.01)
*H04W 4/06* (2009.01)
(Continued)

(52) U.S. Cl.
CPC ............. *H04W 48/16* (2013.01); *H04W 4/06* (2013.01); *H04W 8/005* (2013.01); *H04W 12/04* (2013.01);
(Continued)

(58) Field of Classification Search
CPC ....... H04W 48/16; H04W 4/06; H04W 12/04; H04W 8/005; H04W 80/04; H04W 72/04
See application file for complete search history.

(56) References Cited

U.S. PATENT DOCUMENTS

2008/0065884 A1\* 3/2008 Emeott ................. H04L 9/0836
713/168
2009/0300358 A1\* 12/2009 Pang ..................... H04L 9/0891
713/171
(Continued)

FOREIGN PATENT DOCUMENTS

EP          2986041 A1    2/2016
GB          2499247 A     8/2013
(Continued)

OTHER PUBLICATIONS

Partial International Search Report—PCT/US2016/023543—ISA/EPO—dated Jun. 7, 2016.
(Continued)

*Primary Examiner* — Andrew Lee
(74) *Attorney, Agent, or Firm* — Arent Fox LLP

(57) ABSTRACT

A method, an apparatus, and a computer program product for wireless communication are provided. The apparatus may be a UE. The UE receives a discovery code and key information associated with the discovery code. A discovery message may be generated based on the discovery code. The UE transforms the discovery message using the key information. The UE then broadcasts the transformed discovery message. In a second configuration, the UE receives a first discovery code, key information associated with the first discovery code, and a discovery message containing a second discovery code. The UE unscrambles the discovery message using the key information to obtain the second discovery code. The first discovery code and the second discovery code are compared. If the first and second discovery codes match, the UE may check the integrity of the discovery message and/or remove confidentiality of the discovery message using the key information.

65 Claims, 20 Drawing Sheets

(51) Int. Cl.
*H04W 8/00* (2009.01)
*H04W 12/04* (2009.01)
*H04W 76/10* (2018.01)
*H04L 29/06* (2006.01)
*H04W 12/10* (2009.01)
*H04W 76/14* (2018.01)

(52) U.S. Cl.
CPC ........... *H04W 76/10* (2018.02); *H04L 63/062* (2013.01); *H04L 63/065* (2013.01); *H04L 63/123* (2013.01); *H04W 12/10* (2013.01); *H04W 76/14* (2018.02)

(56) References Cited

U.S. PATENT DOCUMENTS

| | | | | |
|---|---|---|---|---|
| 2009/0323969 | A1* | 12/2009 | Nishi | H04J 13/00 380/281 |
| 2010/0009656 | A1* | 1/2010 | Pang | H04L 63/0823 455/410 |
| 2010/0205434 | A1* | 8/2010 | Kurimoto | G06F 21/78 713/168 |
| 2013/0283044 | A1* | 10/2013 | Tie | H04L 9/08 713/160 |
| 2014/0136511 | A1* | 5/2014 | Hughes | G06F 17/30498 707/714 |
| 2014/0344578 | A1* | 11/2014 | Kim | H04L 63/0428 713/168 |
| 2016/0295406 | A1* | 10/2016 | Agiwal | H04W 12/04 |
| 2016/0302062 | A1* | 10/2016 | Lehtovirta | H04W 8/005 |
| 2017/0164189 | A1* | 6/2017 | Zhong | H04W 12/04 |
| 2017/0195877 | A1* | 7/2017 | Lehtovirta | H04W 12/04 |

FOREIGN PATENT DOCUMENTS

| | | |
|---|---|---|
| WO | 2014114711 A1 | 7/2014 |
| WO | 2014208032 A1 | 12/2014 |
| WO | 2014208034 A1 | 12/2014 |
| WO | 2015010334 A1 | 1/2015 |

OTHER PUBLICATIONS

3GPP: "3rd Generation Partnership Project; Technical Specification Group Services and System Aspects; Feasibility study for Proximity Services (ProSe)", Release 12, 3GPP Draft, 22803-C20, 3rd Generation Partnership Project (3GPP), Mobile Competence Centre, 650, Route Des Lucioles, F-06921 Sophia-Antipolis Cedex, France, Jun. 28, 2013 (Jun. 28, 2013), 45 Pages, XP050906528, Retrieved from the Internet: URL: http://www.3gpp.org/fftp/Specs/2014-12/Rel-12/22_series/ [retrieved on Jun. 28, 2013].
International Search Report and Written Opinion—PCT/US2016/023543—ISA/EPO—dated Sep. 21, 2016.

\* cited by examiner

METHOD AND APPARATUS FOR SECURING STRUCTURED PROXIMITY SERVICE CODES FOR RESTRICTED DISCOVERY

CROSS-REFERENCE TO RELATED APPLICATION(S)

This application claims the benefit of U.S. Provisional Application Ser. No. 62/146,170, entitled "METHODS FOR SECURING STRUCTURED SERVICE CODES FOR RESTRICTED DISCOVERY" and filed on Apr. 10, 2015, which is expressly incorporated by reference herein in its entirety.

BACKGROUND

Field

The present disclosure relates generally to communication systems, and more particularly, to device discovery.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer program product, and an apparatus are provided. The apparatus may be an announcing user equipment (UE). The UE receives a discovery code. The UE generates a discovery message based on the discovery code. The UE also receives key information associated with the discovery code. The UE transforms the discovery message using the key information. The UE then broadcasts the transformed discovery message.

In another aspect of the disclosure, a method, a computer program product, and an apparatus are provided. The apparatus may be a monitoring UE. The UE receives a first discovery code. The UE receives a discovery message containing a second discovery code. The UE receives key information associated with the first discovery code. The UE unscrambles the discovery message using the key information to obtain the second discovery code. The UE compares the first discovery code and the second discovery code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
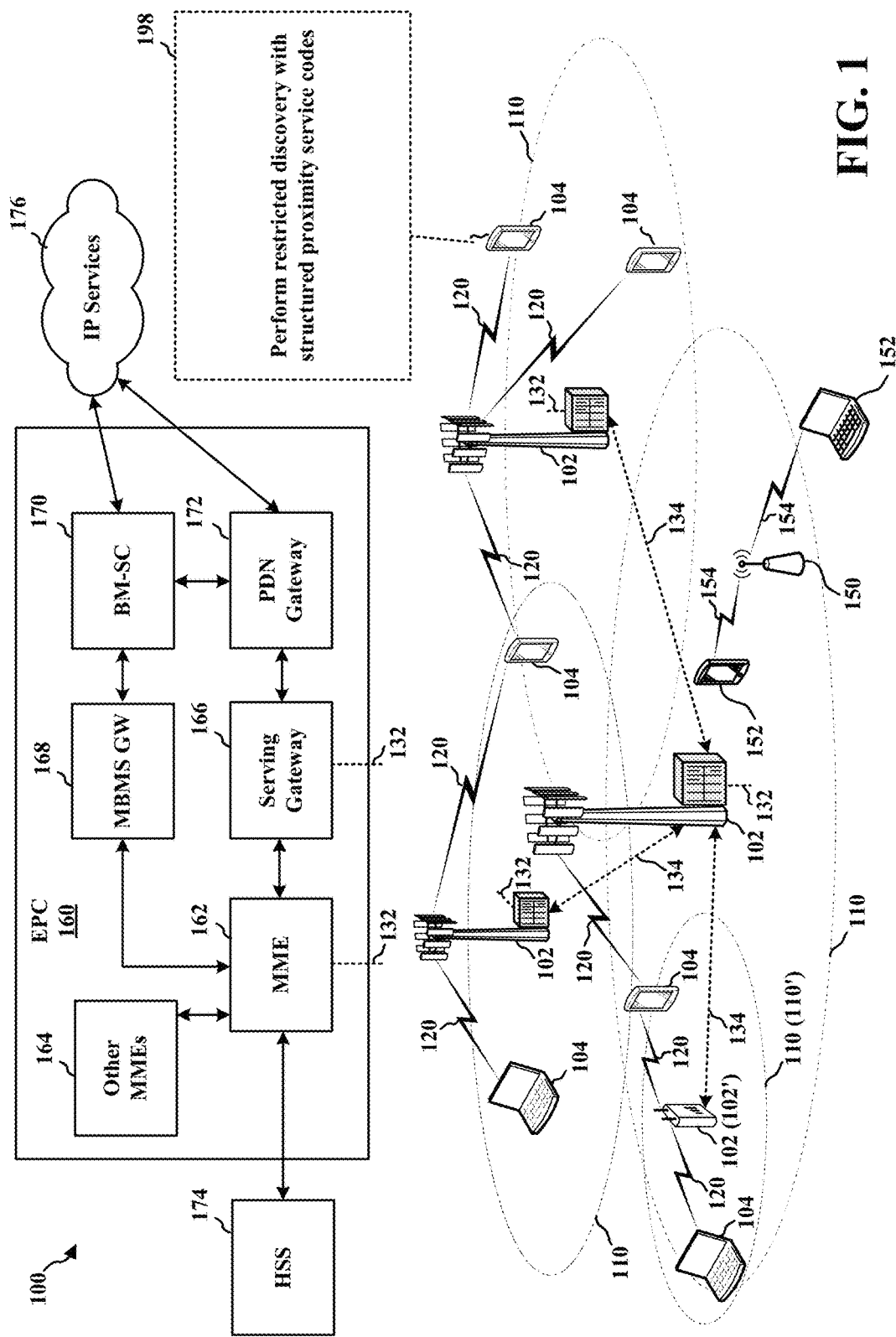
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform (198) restricted discovery with structured proximity service codes. Details of the operations performed at 198 are described below with reference to FIGS. 4-20.

Figure 2:
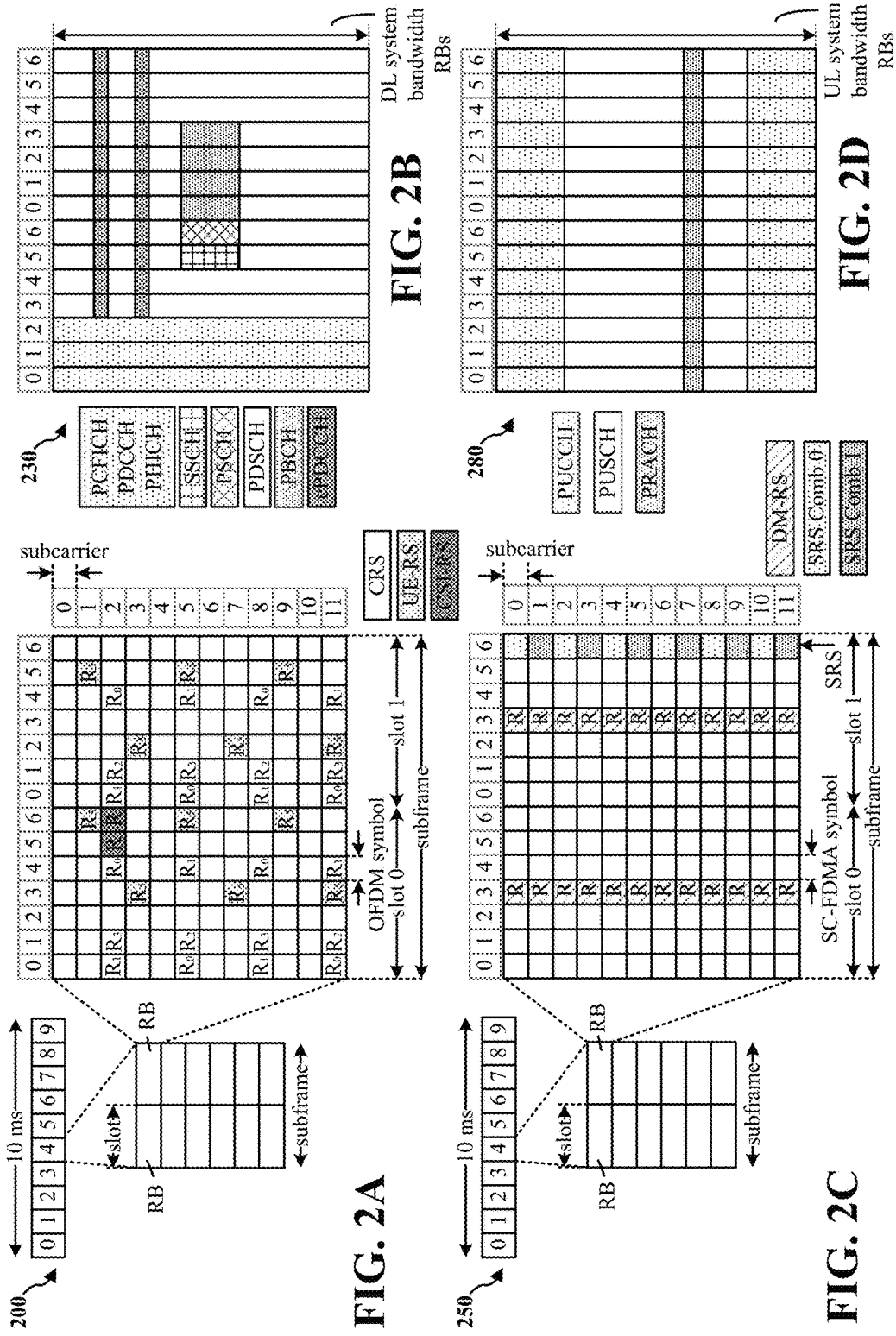
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
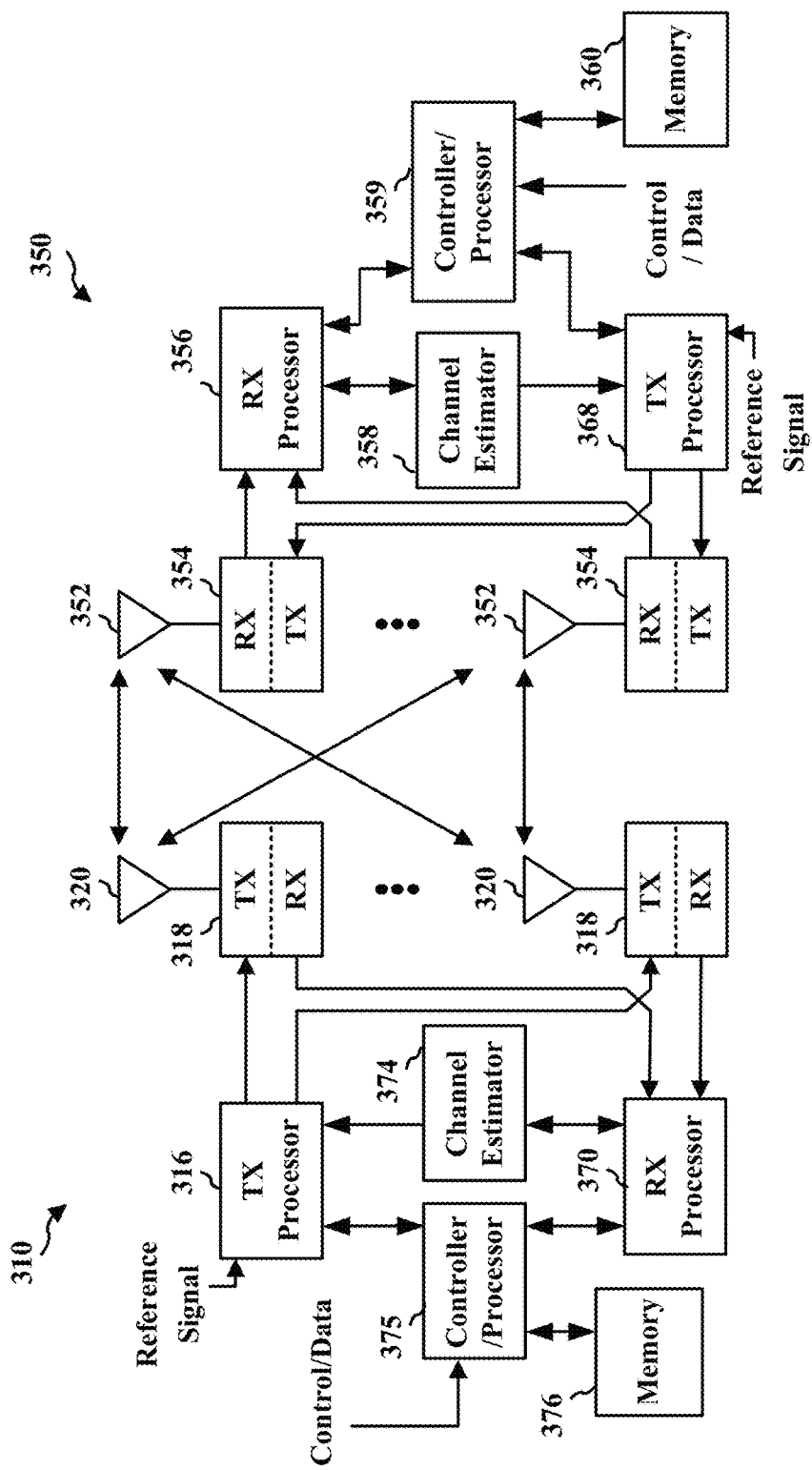
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
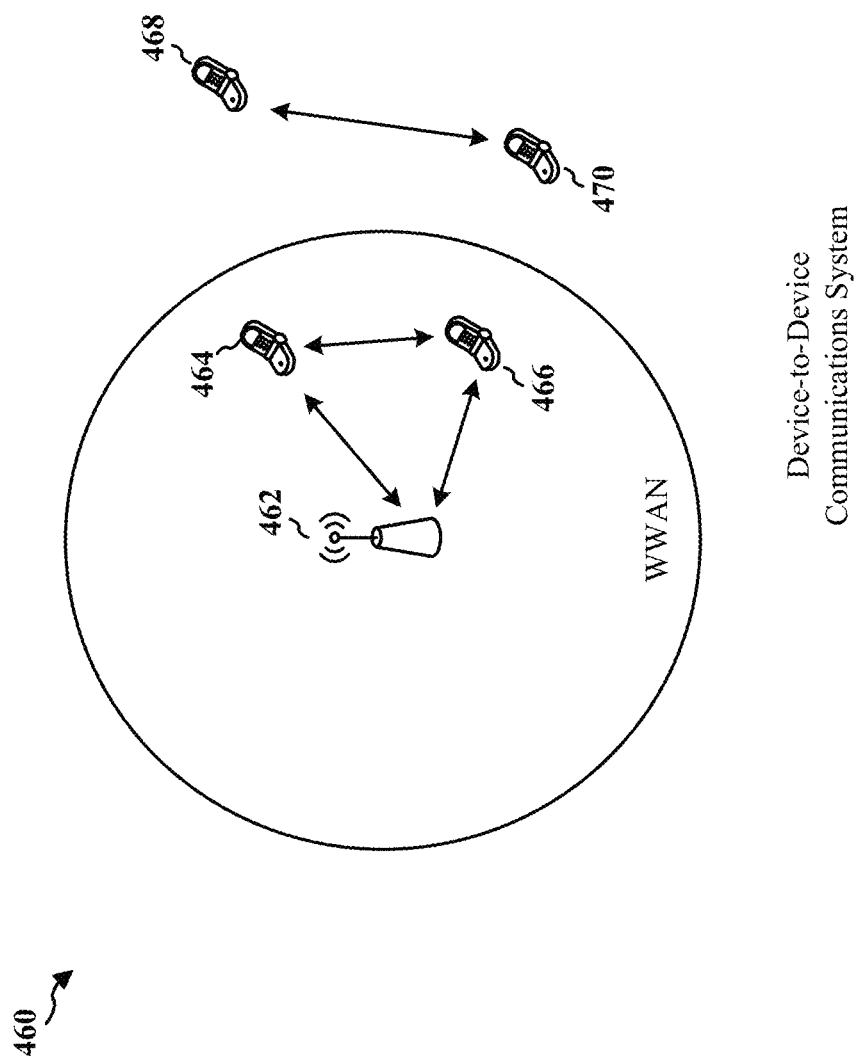
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A UE may use discovery messages received from neighbor UEs to identify neighbor UEs in order to establish and conduct device-to-device communication. In particular, proximity services (ProSe) direct discovery message may be used in device-to-device wireless communication to discover neighbor UEs. For example, a discovery message received from a neighbor UE may include information about the neighbor UE such that the neighbor UE can be identified based on the discovery message.

A UE who broadcasts discovery messages is an announcing UE. A UE who listens to discovery messages transmitted by neighboring UEs is a monitoring UE. Discovery messages may contain restricted discovery codes that make sense to the monitoring UEs in proximity that have been specifically authorized by the announcing UE. In one configuration, the restricted discovery codes are ProSe codes that contain a structure.

Figure 5:
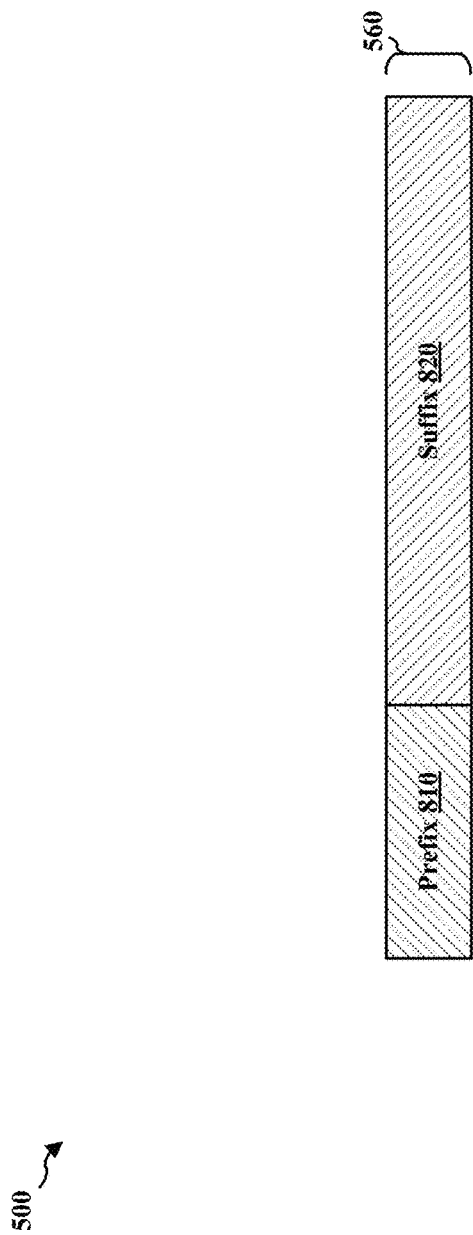
FIG. 5 is an example diagram illustrating a structure of a discovery message.

FIG. 5 is an example diagram 500 illustrating a structure of a discovery message. In one configuration, the discovery message 560 includes a ProSe code. As illustrated, the discovery message 560 has a prefix portion 510 and a suffix portion 520. In one configuration, the prefix portion 510 is assigned by a network server and the suffix portion 520 is controlled by the UE or ProSe application. This structure of the discovery message allows for part of the ProSe code to be reserved for the ProSe application and it may allow for a number of mobile services, e.g. group discovery, dating, advertising, etc. This structure of the discovery message also allows partial matching of a ProSe code. For this purpose, the Restricted ProSe Application User ID may be configured by the application in a tiered format. The ProSe Function (i.e., the network server) generates the ProSe code corresponding to the tiered format of the Restricted ProSe Application User ID. The intent of these codes is to allow some part(s) of the code to be matched independently from other parts of it, e.g. match a group identifier (a prefix) but not the member identifier (the suffix).

Since these structured codes are restricted discovery codes, they need to be protected against tracking (by passive and unauthorized UEs), impersonation (by any other UE), and replay (of an announced ProSe code at a later time). In addition, there are requirements on integrity and confidentiality protection of these restricted codes. In addition, it is preferable that the ProSe code's structure is preserved through the process of applying security measures to protect these codes.

Figure 6:
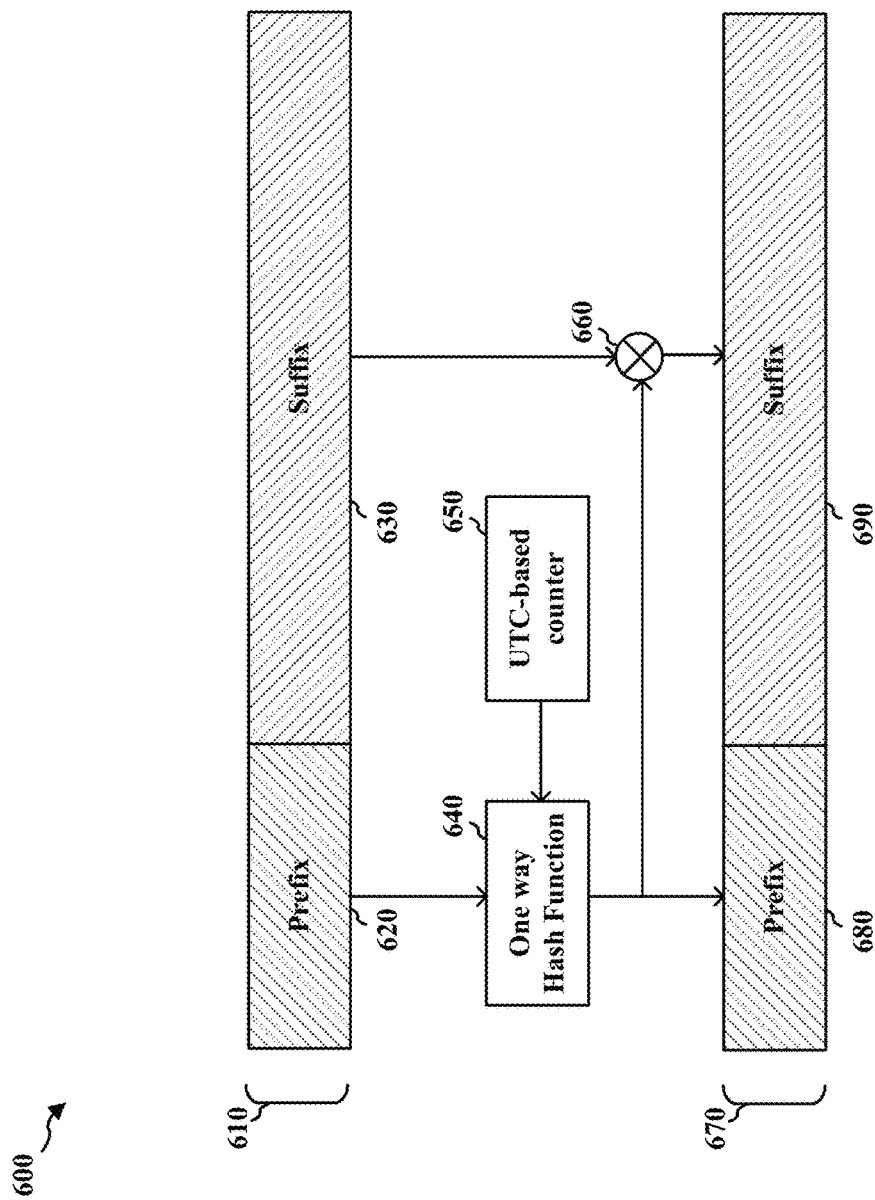
FIG. 6 is an example diagram illustrating transforming of a discovery message.

One simple solution to achieve some tracking/replay protection for restricted discovery ProSe codes involves time-hashing with an UTC-based counter. This effectively scrambles the announced code so that it looks different from one discovery slot to another. FIG. 6 is an example diagram 600 illustrating transforming of a discovery message, according to an aspect of the disclosure. For example, a discovery message 610 may be made secure by encoding the discovery message 610 to generate a secured discovery message 670. The discovery message 610 including a prefix portion 620 and a suffix portion 630. The prefix portion 620 may include a group ID such as a layer-2 (L2) group ID and a group key ID such as ProSe group key ID (PGK ID). The suffix portion 630 includes the UE's own ID (e.g., L2 ID), the UE's own hierarchy, IDs (e.g., L2 IDs) of the UE's neighbor UEs, and hierarchy values of the UE's neighbor UEs.

The UE applies a one-way hash function 640 to encode the group ID and the group key ID in the prefix portion 620, based on a universal time coordinated (UTC) based counter 650. In one configuration, the UTC-based counter 650 has the same system time that is used in open discovery. The prefix portion 680 is generated by encoding the group ID and the group key ID based on the one-way hash function 640 and the UTC-based counter 650. A portion of the output from the one-way hash function 640 is combined with the suffix portion 630 by an XOR operation 660 to generate a suffix portion 690 of the secured discovery message 670. Thus, the secured discovery message 670 includes a restricted prefix portion 680 and an open-in-nature suffix portion 690.

A monitoring UE that receives a discovery message including the announced discovery message 670 may attempt to decode the prefix portion 680 first. If the monitoring UE has the same group ID and the same group key ID as the group ID and the group key ID of the prefix portion 620 of the discovery message 610, the monitoring UE will be able to decode the prefix portion 680 of the announced discovery message 670. Subsequently, the monitoring UE may decode the suffix portion 690 of the announced discovery message 670, for example, by performing an XOR operation with the suffix portion 690 and a portion of an output of a one-way hash function of the group ID and the group key ID. Thus, the suffix is decoded via a similar XOR operation to the XOR operation 660.

The prefix of a discovery message is known in advance by monitoring UEs, while the suffix of the discovery message, which may contain information unknown to the monitoring UEs in advance (e.g., application-controlled information), can only be decoded after the prefix is matched. In one configuration, in order to delineate the split between the bits to be matched and the ones that should be decoded after the match, the network server provides to both announcing UEs and monitoring UEs of a ProSe code, a match bits mask and/or a settable bits mask. The prefix may be selected via the match bits mask, or the match bits mask plus the user-specific assigned bits.

Anti-replay/tracking/impersonation of the ProSe code can be achieved by applying time-hashing to the message as described below. Both the announcing UE and the monitoring UE may be provided with key information (e.g., from the network) in order to derive a scrambling key to be used with the time-hash. In one configuration, the key information received by the UEs may be a collection of different keys. In such configuration, the scrambling key may be derived by selecting a corresponding key from the collection of keys. In one configuration, the key information received by the UEs may be a master key. In such configuration, the scrambling key may be derived mathematically from the master key. In one configuration, the master key may be a concatenation of different keys. In such configuration, the scrambling key may be derived by identifying the scrambling key within the master key, e.g., by applying a pre-configured bits mask on the master key.

In one configuration, confidentiality of the user specific bits can be achieved via performing an XOR operation on the user specific bits with a key stream derived from a key given by the network server as associated with the assigned prefix. In one configuration, the key stream may be derived mathematically from the key given by the network server. In one configuration, the key given by the network server may be a collection of different keys and the key stream may be derived based on one or more keys selected from the collection of keys. In one configuration, the key given by the network server may be a concatenation of different keys and the key stream may be derived based on one or more keys identified within the key given by the network server. In the case of a discovery filter that finds only one UE, confidentiality of the user specific bits can be achieved by the time-hashing for anti-replay/tracking/impersonation described above. Otherwise the confidentiality of the user specific bits can be achieved as described below using a key that is specific for confidentiality and should be different for each UE.

In one configuration, integrity of entire ProSe code can be achieved via network server checked Message Integrity Codes (MICs) just like for Open Discovery or by a locally checked MIC as described in this disclosure. In the former case, the network server may provide the announcing/monitoring UEs with a Discovery Key. In the latter case, both the announcing and the monitoring UE may be provided with the information (e.g., from the network) to be able to derive an integrity key. In one configuration, the information received by the UEs may be a collection of different keys. In such configuration, the integrity key may be derived by selecting a corresponding key from the collection of keys. In one configuration, the information received by the UEs may be a master key. In such configuration, the integrity key may be derived mathematically from the master key. In one configuration, the master key may be a concatenation of different keys. In such configuration, the integrity key may be derived by identifying the integrity key within the master key, e.g., by applying a pre-configured bits mask on the master key.

One solution to achieve all three measures above can be as follows: a UE (that is either sending or receiving a discovery message) is provided with key information (e.g., a Discovery User Master Key (DUMK)) for an assigned ProSe code (or ProSe code prefix). From this key information, a UE derives as necessary: Discovery User Scrambling Key (DUSK), to calculate a time-hash bit sequence; Discovery User Integrity Key (DUIK), may be needed if there are user-specific bits but Match Reports are not desired; Discovery User Confidentiality Key (DUCK), to protect the suffix if there is one. In one configuration, a UE uses different key derivation functions to derive DUSK, DUIK, and DUCK from the key information. In one configuration, the key information may be a collection or concatenation of keys, and a UE may derive DUSK, DUIK, and DUCK from the key information by select/identify the corresponding keys from the collection or concatenation of keys. The network server may also provide mask(s) (all of the same length as the ProSe code) to indicate several needed parameters. The presence of these masks and other parameters may inform the UE what security to apply.

Key calculation mask selects which bits of message are used to calculate the DUCK/DUIK from key information received from the network (e.g., DUMK). If an announcing UE gets key calculation mask and there is no Discovery Key from the network server for a particular ProSe code, then it shall apply integrity using the DUIK associated to that ProSe code to messages containing that ProSe code. Similarly if a monitoring UE gets key calculation mask and no indication to do Match Reports, it checks the integrity of message for a particular discovery filter using the DUIK associated with that discovery filter. In one configuration, the key calculation masks for calculating DUCK and DUIK of a discovery message may be different. In another configuration, the key calculation masks for calculating DUCK and DUIK of a discovery message may be the same.

Encrypted bits mask selects which bits are protected by DUCK (as opposed to the DUSK). This may be set to all zeros if the is no suffix. In one configuration, if the announcing UE or monitoring UE gets both key calculation mask and encrypted bits mask from the network server, it applies or removes confidentiality based on DUCK respectively.

Scrambled bits mask selects which bits scrambling protects (time-hash applied before sending or after receiving).

This could be set to all ones (i.e. select all the bits in the ProSe code). In one configuration, if the announcing or monitoring UE gets scrambled bits mask, they can apply it in time hashing.

Match bits mask selects the bits of the received ProSe Code that the matching should be performed on. Match bits mask signals which part of the code (e.g., prefix) the matching is supposed to be done on.

Settable bits mask selects the bits of the to-be-announced ProSe code that can be set by the application or UE. Settable bits mask delineates prefix from suffix, i.e. signal structure of the code.

Figure 7:
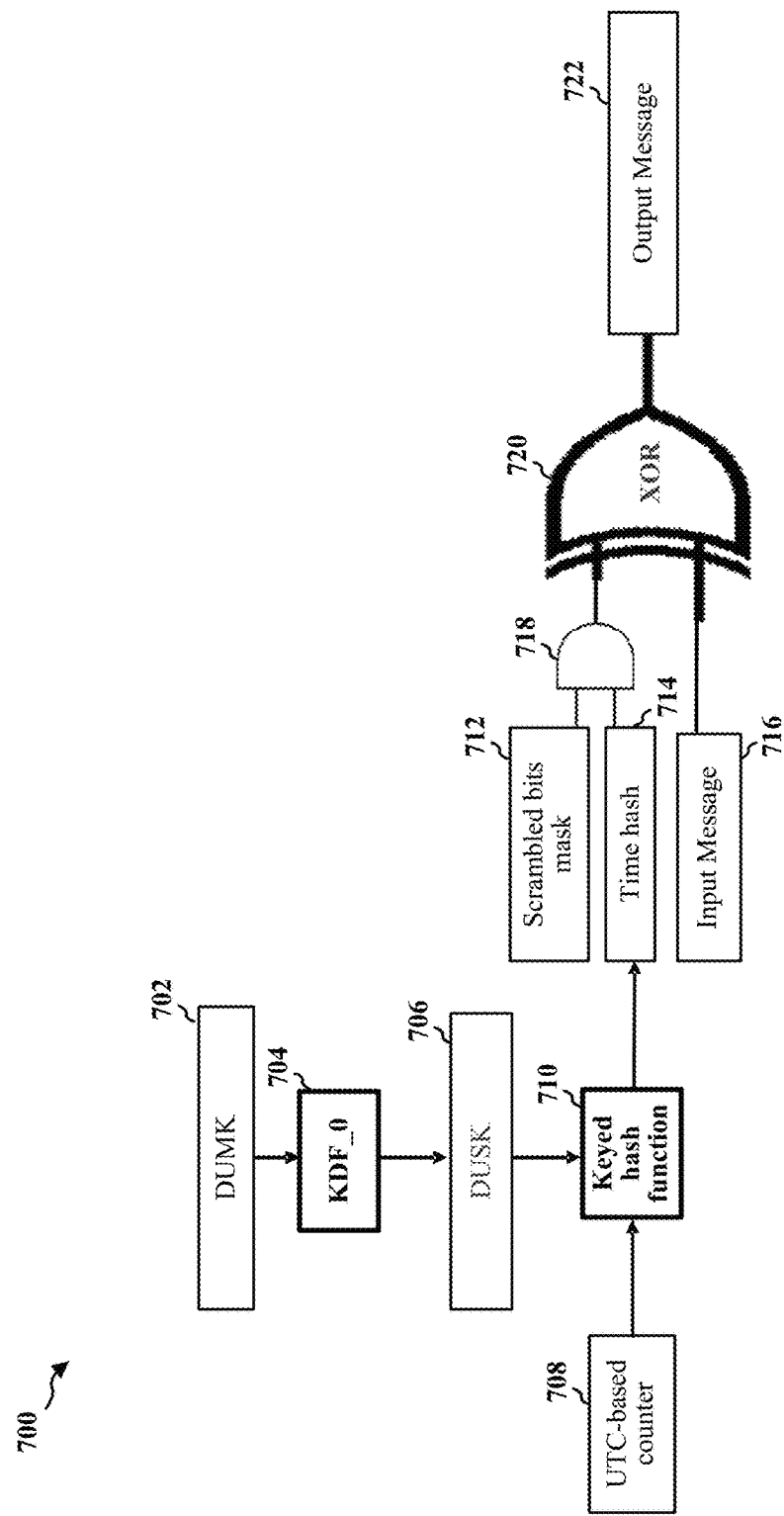
FIG. 7 is an example diagram illustrating scrambling/unscrambling of discovery messages by a UE.

FIG. 7 is an example diagram 700 illustrating scrambling/unscrambling of discovery messages by a UE, according to an aspect of the disclosure. This method can be performed by either an announcing UE or a monitoring UE. The announcing UE performs this method to scramble the original discovery messages. The monitoring UE performs this method to unscramble the announced discovery messages.

As illustrated in FIG. 7, the UE derives a DUSK 706 from key information received from the network (e.g., DUMK 702) using a key derivation function 704. In one configuration, the DUMK 702 may be a collection or concatenation of keys and the key derivation function 704 may be used to identify or select the DUSK 706 from the collection or concatenation of keys. The UE then uses a keyed hash function 710 to obtain a time-hash value 714 based on the DUSK 706 and a UTC-based counter 708. In one configuration, the UE first performs a logical conjunction operation 718 on the time-hash value 714 and the scrambled bits mask 712. The UE then performs an XOR operation 720 on the output of the logical conjunction operation 718 and the input message 716 to generate the output message 722. In another configuration, no scrambled bits mask is used and the XOR operation 720 is performed on the time-hash value 714 and the input message 716 to generate the output message 722.

For an announcing UE, the input message 716 is either the original discovery message if no other protection is being applied or original discovery message with other protection applied and the output message 722 is the announced discovery message. For a monitoring UE, the input message 716 is the received announced discovery message and the output message 722 is either the recovered original discovery message or the original discovery message with other protection applied. Once the monitoring UE has the output message 722, the monitoring UE can check for matches of ProSe codes.

Figure 8:
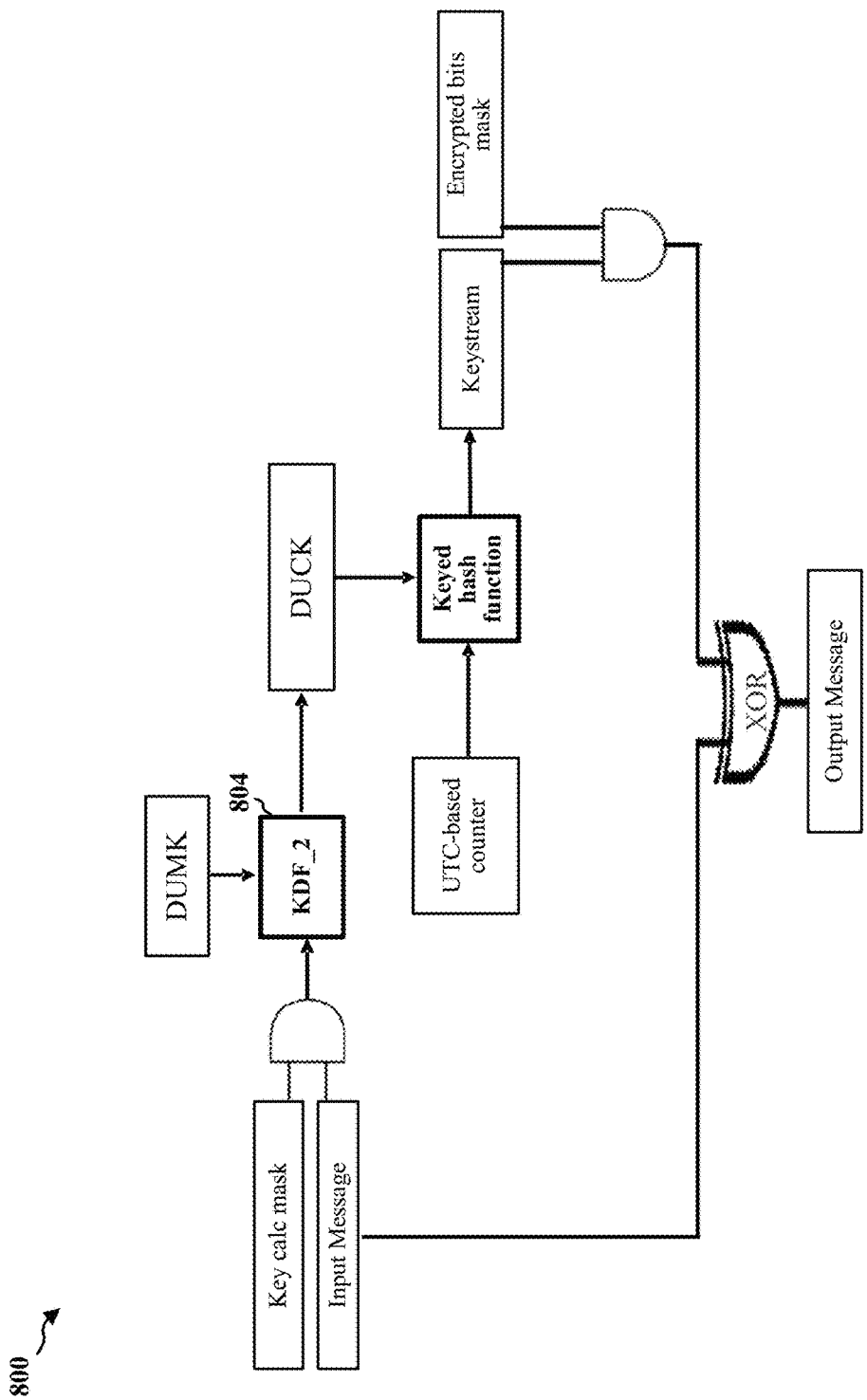
FIG. 8 is an example diagram illustrating providing/removing confidentiality in relation to discovery messages by a UE.

FIG. 8 is an example diagram 800 illustrating providing/removing confidentiality in relation to discovery messages by a UE, according to an aspect of the disclosure. This method can be performed by either an announcing UE or a monitoring UE. The announcing UE performs this method to provide confidentiality to original discovery messages. The monitoring UE performs this method to remove confidentiality from the announced discovery message.

As illustrated in FIG. 8, the UE performs a logical conjunction operation on the key calculation mask and the input message. The UE then derives a DUCK based on key information received from the network (e.g., DUMK) and the result of the logical conjunction operation using a key derivation function 804. In one configuration, the DUMK may be a collection or concatenation of keys. The UE uses a keyed hash function to obtain a key stream based on the DUCK and a UTC-based counter. The UE further performs a logical conjunction operation on the key stream and encrypted bits mask. In one configuration, the encrypted bits mask may be a logical complement of the key calculation mask. The UE then performs a XOR operation on the result of the logical conjunction operation and the input message to generate the output message.

For an announcing UE, the input message is the original discovery message and the output message is the announced discovery message. For a monitoring UE, the input message is the received announced discovery message with the scrambling removed and the output message is the recovered original discovery message.

Figure 9:
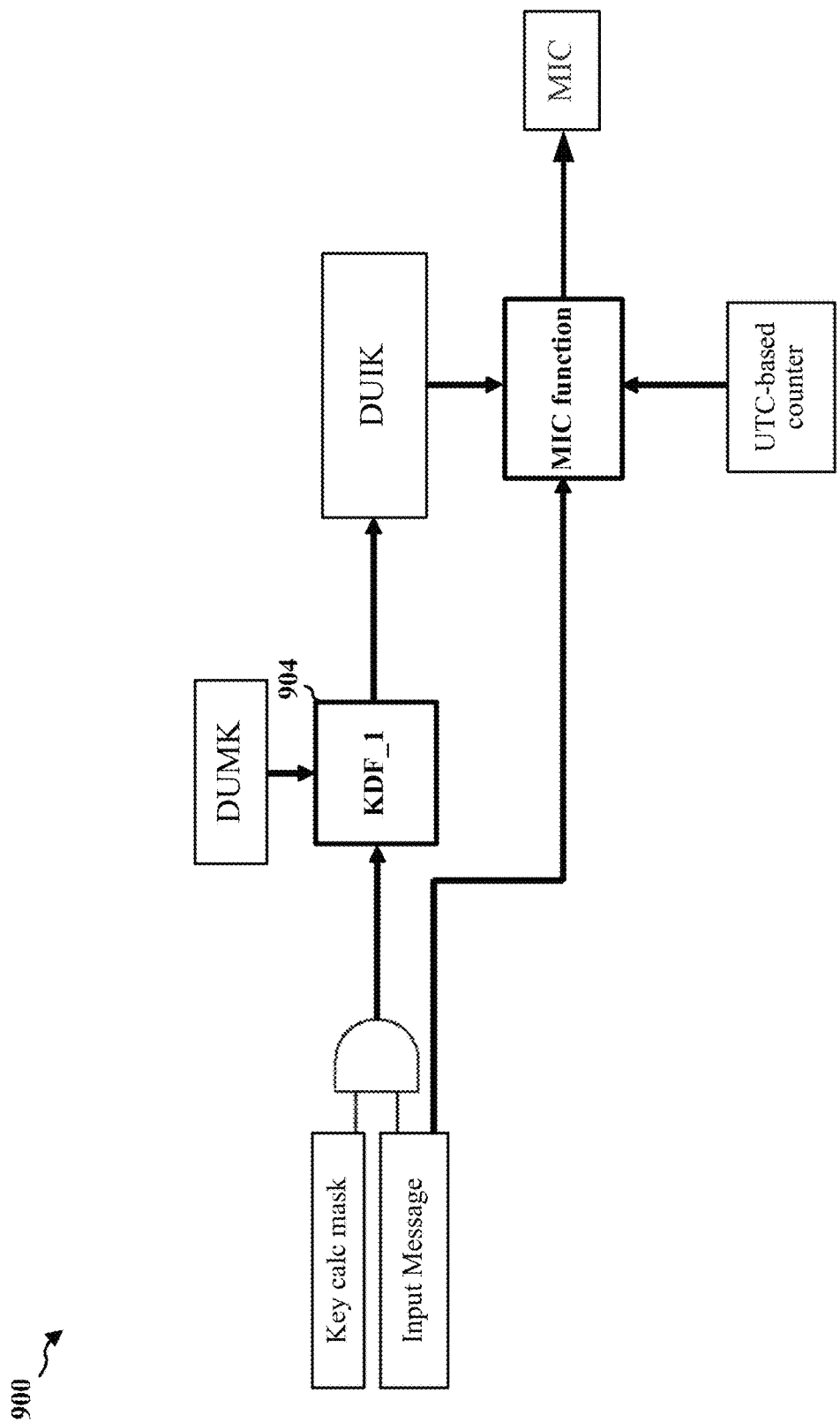
FIG. 9 is an example diagram illustrating calculating MIC for discovery messages by a UE.

FIG. 9 is an example diagram 900 illustrating calculating MIC for discovery messages by a UE, according to an aspect of the disclosure. This method can be performed by either an announcing UE or a monitoring UE. The announcing UE performs this method to generate a MIC to be added to the original discovery messages. The monitoring UE performs this method to generate a MIC to compare with the MIC contained within the announced discovery message in order to verify the announced discovery message.

As illustrated in FIG. 9, the UE performs a logical conjunction operation on the key calculation mask and the input message. In one configuration, the key calculation mask may select anything that is not encrypted. Bits in the positions indicated by key calculation mask could be set to a random number by the UE, to minimize the leaking of information from the discovery message. The key calculation mask is given to announcing UEs and monitoring UEs in advance. The UE derives a DUIK based on key information received from the network (e.g., DUMK) and the result of the logical conjunction operation using a key derivation function 904. In one configuration, the DUMK may be a collection or concatenation of keys. The UE then uses a MIC function to generate a MIC based on the DUIK, the input message, and a UTC-based counter.

For an announcing UE, the input message is either the original discovery message or the original discovery message with confidentiality applied. The generated MIC at the announcing UE is added to the discovery message. For a monitoring UE, the input message is the received announced discovery message with either both the scrambling and confidentiality removed, that is the original discovery message, or just the scrambling removed, that is the original discovery message with confidentiality applied. The generated MIC at the monitoring UE is to be compared with the MIC contained within the received announced discovery message to verify the integrity of the announced discovery message.

Figure 10:
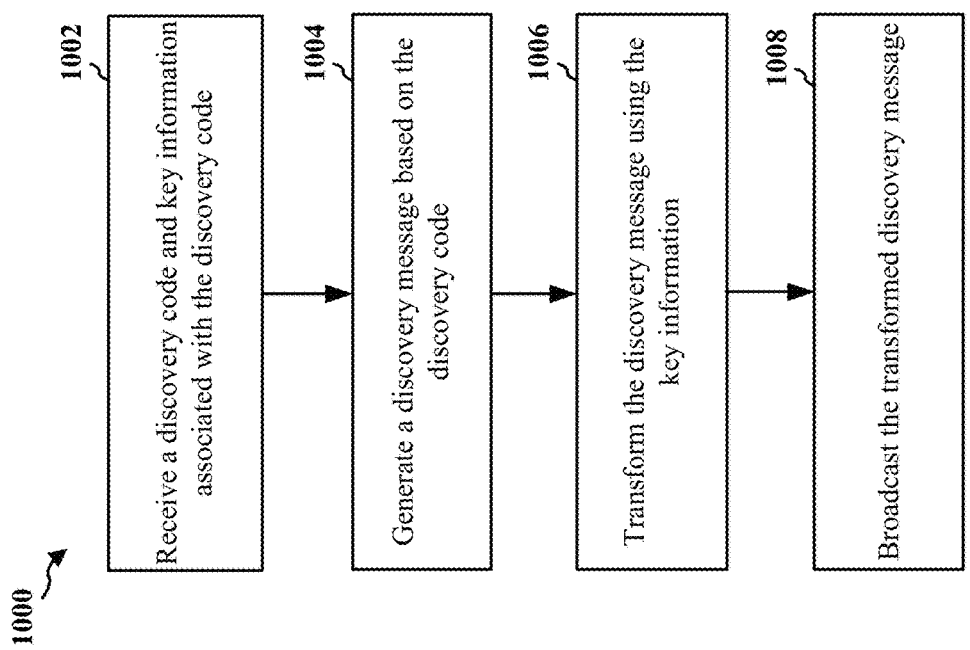
FIG. 10 is a flowchart of a method of wireless communication.

FIG. 10 is a flowchart 1000 of a method of wireless communication. The method may be performed by an announcing UE. At 1002, the UE receives a discovery code and key information (e.g., DUMK) associated with the discovery code from a network server. In one configuration, the key information may be a collection or concatenation of keys. In one configuration, the discovery code is a ProSe code that includes a prefix portion and a suffix portion, as described in FIG. 5 above.

At 1004, the UE generates a discovery message based on the discovery code. In one configuration, the UE receives a settable bits mask from the network server. The UE sets the chosen-bits it wants to send. The UE then generates the discovery message by performing an XOR operation on the discovery code and a logical conjunction of the chosen-bits and the settable bits mask.

At 1006, the UE transforms the discovery message using the key information. In one configuration, operations at 1006 are the operations described in FIG. 11 below. Finally, at 1008, the UE broadcasts/announces the transformed discovery message.

Figure 11:
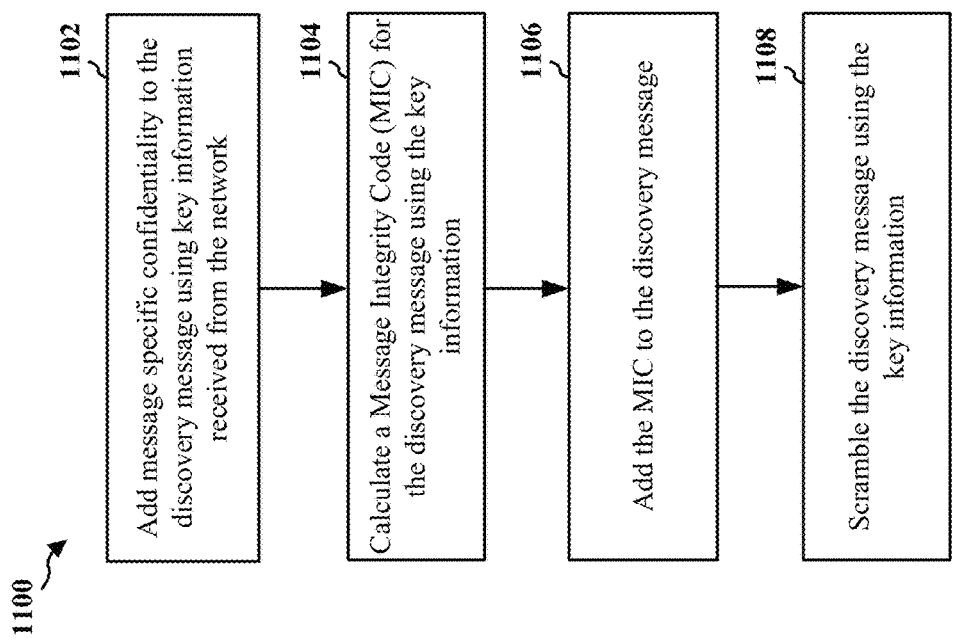
FIG. 11 is a flowchart of a method of wireless communication.

FIG. 11 is a flowchart 1100 of a method of wireless communication. The method may be performed by an announcing UE. In one configuration, the method performs operations described at 1006 of FIG. 10 above. At 1102, the UE adds message specific confidentiality to the discovery message using key information received from the network. In one configuration, the operations at 1102 may be the operations described in FIG. 13 below. In one configuration, operations at 1102 may be omitted if there are no user-specific bits.

At 1104, the UE calculates a Message Integrity Code (MIC) for the discovery message using the key information. In one configuration, the operations at 1104 may be the operations described in FIG. 14 below. At 1106, the UE adds the MIC to the discovery message. In one configuration, operations at 1104 and 1106 may be omitted if there are no user-specific bits and Match Reports are not requested by network. At 1108, the UE scrambles the discovery message using the key information. In one configuration, the operations at 1108 may be the operations described in FIG. 12 below.

In one configuration, operations at 1102 are performed before operations at 1104 and the MIC is calculated at 1104 based on the discovery message updated by operations at 1102. In another configuration, operations at 1104 are performed before operations at 1102. In one configuration, operations at 1102 may be omitted. In another configuration, operations at 1104 and 1106 may be omitted. In yet another configuration, operations at 1102-1106 may be omitted.

Figure 12:
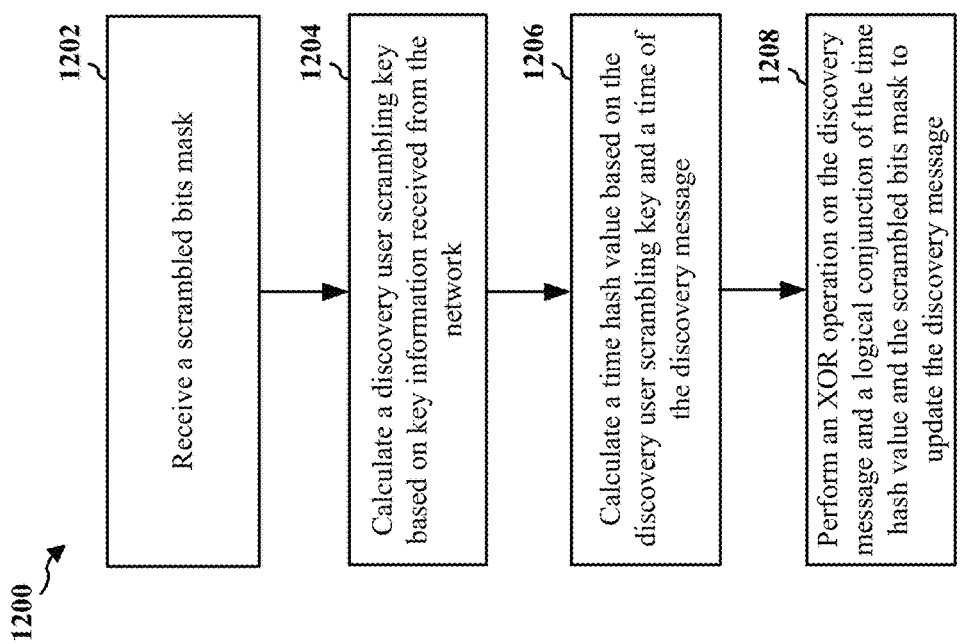
FIG. 12 is a flowchart of a method of wireless communication.

FIG. 12 is a flowchart 1200 of a method of wireless communication. The method may be performed by an announcing UE or a monitoring UE. The method scrambles an original discovery message when performed by an announcing UE. The method unscrambles an announced discovery message when performed by a monitoring UE. In one configuration, the method performs operations described in 1108 of FIG. 11 above. In one configuration, the method performs operations described in FIG. 7 above.

At 1202, the UE receives a scrambled bits mask from a network server. At 1204, the UE calculates a DUSK based on key information received from the network. At 1206, the UE calculates a time-hash value based on the DUSK and a time of the discovery message.

Finally, at 1208, the UE performs an XOR operation on the discovery message and a logical conjunction of the time hash value and the scrambled bits mask to update the discovery message. In one configuration, no scrambled bits mask is used and the XOR operation at 1208 is performed on the time-hash value and the discovery message to generate a scrambled discovery message. In one configuration, the input discovery message at 1208 is the output discovery message of operations at 1102 or 1106 of FIG. 11 above. In one configuration, the input discovery message at 1208 is the announced discovery message received at 1704 of FIG. 17 below.

Figure 13:
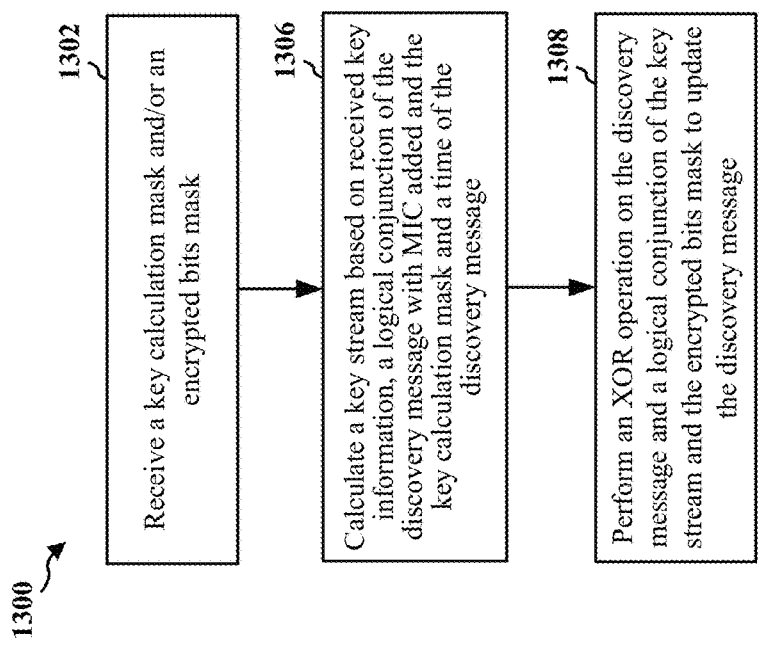
FIG. 13 is a flowchart of a method of wireless communication.

FIG. 13 is a flowchart 1300 of a method of wireless communication. The method may be performed by an announcing UE or a monitoring UE. In one configuration, the method performs operations described in 1102 of FIG. 11 above. In another configuration, the method performs operations to be described at 1716 of FIG. 17 below. In one configuration, the method performs operations described in FIG. 8 above. At 1302, the UE receives a key calculation mask and/or an encrypted bits mask from a network server. In one configuration, the encrypted bits mask and the key calculation mask may be a logical complement of each other. In such configuration, the UE may receive one of the encrypted bits mask and the key calculation mask, and calculate the other as a logical complement of the received one.

At 1306, the UE calculates a key stream based on received key information, a logical conjunction of the discovery message with MIC added and the key calculation mask and a time of the discovery message. In one configuration, the UE may derive a DUCK based on the received key information and a logical conjunction of the discovery message and the key calculation mask. In one configuration, the input discovery message at 1306 may be the output discovery message of operations at 1004 of FIG. 10 above. In another configuration, the input discovery message at 1306 may be the output discovery message of operation at 1106 of FIG. 11 above. In yet another configuration, the input discovery message at 1306 may be the output discovery message of operation at 1708 or 1712 of FIG. 17 below. In one configuration, the DUCK may be derived based on the received key information and a logical conjunction of the discovery message with the MIC added and the key calculation mask.

Finally, at 1308, the UE performs an XOR operation on the discovery message and a logical conjunction of the key stream and the encrypted bits mask to update the discovery message. In one configuration, the input discovery message at 1308 is the output discovery message of operations at 1004 of FIG. 10 above. In another configuration, the input discovery message at 1308 is the output discovery message of operation at 1106 of FIG. 11 above. In yet another configuration, the input discovery message at 1308 is the output discovery message of operation at 1708 or 1712 of FIG. 17 below.

Figure 14:
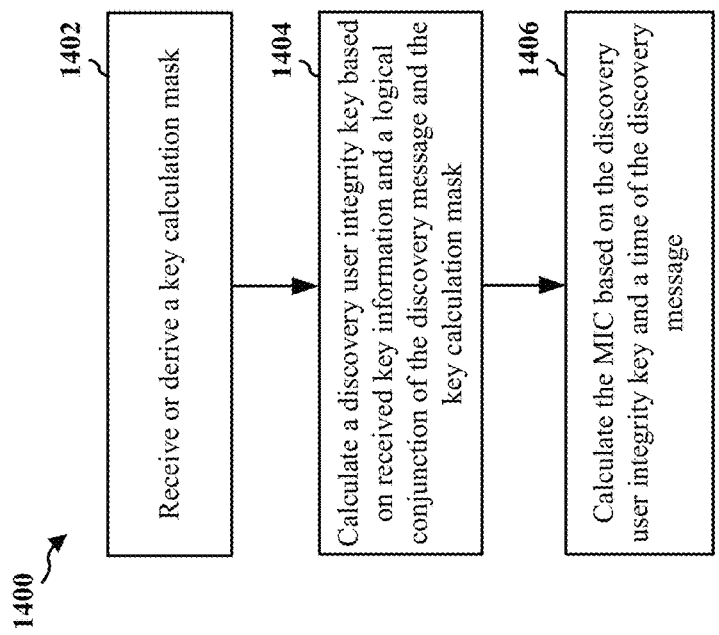
FIG. 14 is a flowchart of a method of wireless communication.

FIG. 14 is a flowchart 1400 of a method of wireless communication. The method may be performed by an announcing UE. In one configuration, the method performs operations described in 1104 of FIG. 11 above. In one configuration, the method performs operations described in FIG. 9 above. At 1402, the UE receives a key calculation mask from a network server or derives the key calculation mask from a received encrypted bits mask.

At 1404, the UE calculates a DUIK based on received key information (e.g., DUMK) and a logical conjunction of the discovery message and the key calculation mask. In one configuration, the input discovery message at 1404 is the output discovery message of operations at 1004 of FIG. 10 above. In another configuration, the input discovery message at 1404 is the output discovery message of operation at 1102 of FIG. 11 above. In one configuration, the DUIK is calculated based on the received key information and a logical conjunction of the discovery message with a temporary all zero MIC added and the key calculation mask. At 1406, the UE calculates the MIC based on the DUIK and a time of the discovery message.

Figure 15:
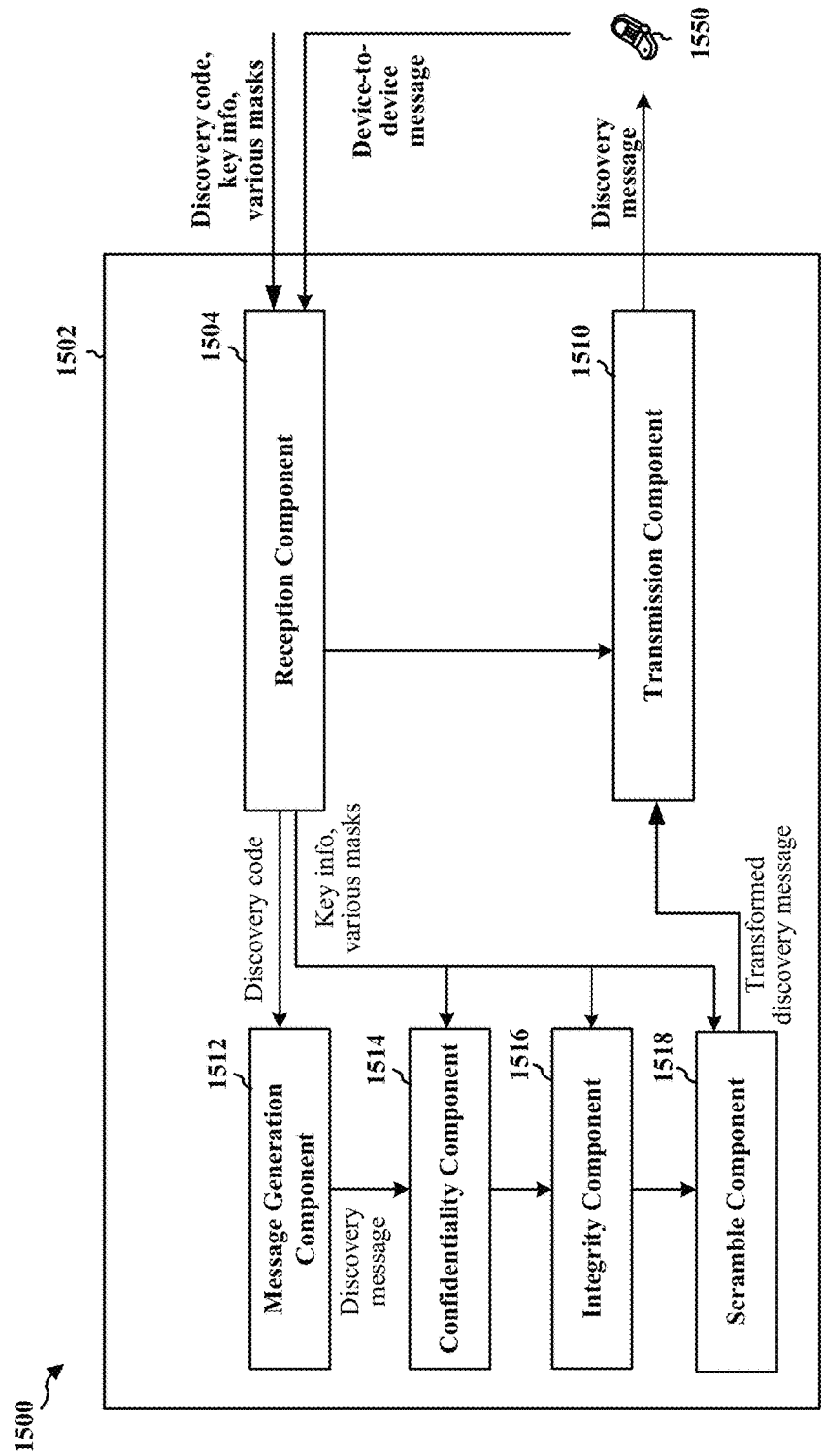
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be an announcing UE. The apparatus 1502 includes a transmission component 1510 that is to transmit discovery messages to a monitoring UE 1550 or other monitoring UEs (not shown). The apparatus 1502 also includes a reception component 1504 that is to attempt to receive device-to-device messages from the UE 1550 and other UEs (not shown). The reception component 1504 is also to receive discovery code, key information (e.g., DUMK), and various masks from the network server.

The apparatus 1502 may include a message generation component 1512 that generates a discovery message based on the received discovery code. In one configuration, the message generation component 1512 may perform operations described above with reference to 1004 of FIG. 10.

The apparatus 1502 may include a confidentiality component 1514 that adds message specific confidentiality to the discovery message using the key information. In one configuration, the confidentiality component 1514 may perform operations described above with reference to FIG. 13 or 1102 of FIG. 11.

The apparatus 1502 may include an integrity component 1516 that adds MIC to the discovery message using the key information. In one configuration, the integrity component 1516 may perform operations described above with reference to FIG. 14 or 1104, 1106 of FIG. 11.

The apparatus 1502 may include a scramble component 1518 that scrambles the discovery message using the key information. In one configuration, the scramble component 1518 may perform operations described above with reference to FIG. 12 or 1108 of FIG. 11.

The apparatus may include additional components that perform each of the blocks of the algorithm in the aforementioned flowcharts of FIGS. 10-14. As such, each block in the aforementioned flowcharts of FIGS. 10-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
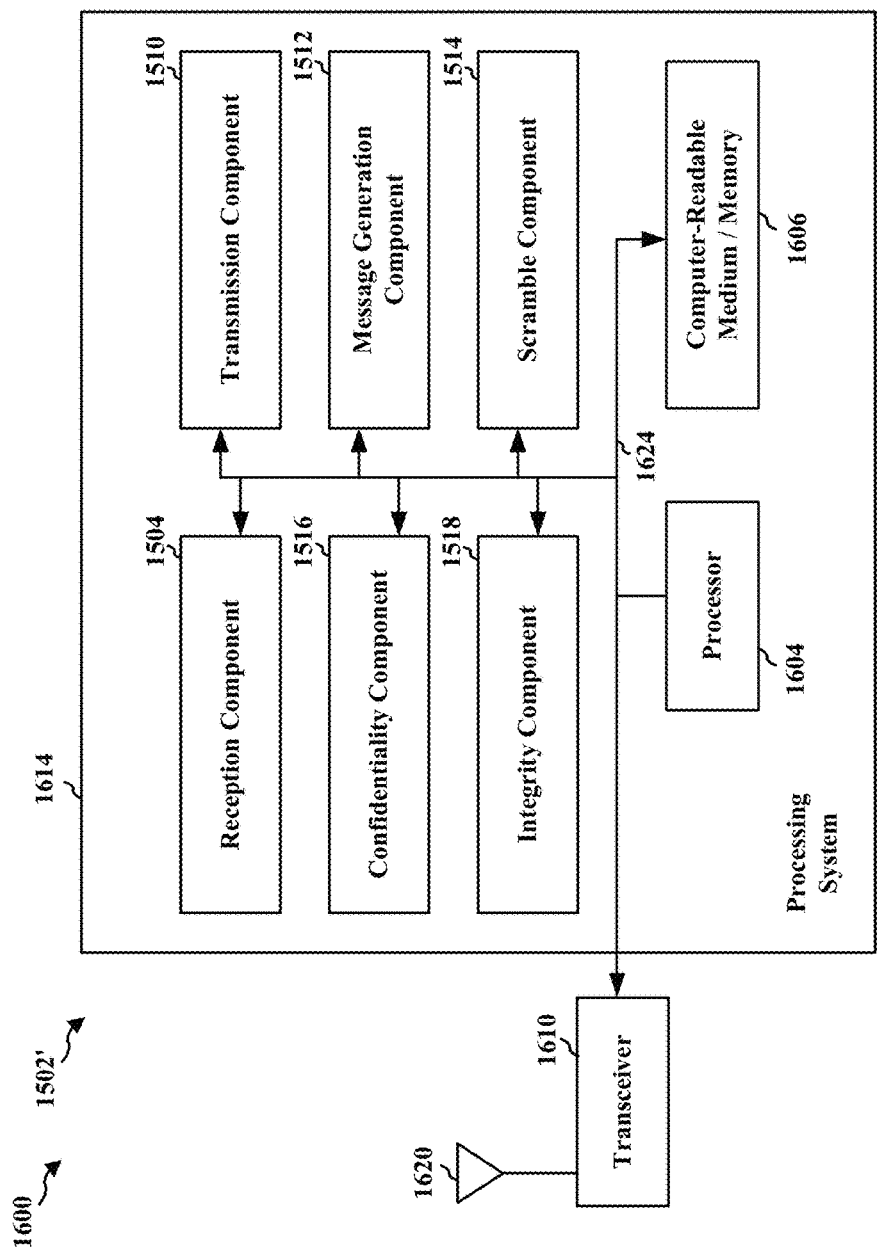
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1510, 1512, 1514, 1516, 1518, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the components 1504, 1510, 1512, 1514, 1516, and 1518. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving a discovery code and key information associated with the discovery code, means for generating a discovery message based on the discovery code, means for transforming the discovery message using the key information, and means for broadcasting the transformed discovery message.

In one configuration, the means for transforming the discovery message is configured to scramble the discovery message using the key information. In one configuration, to scramble the discovery message, the means for transforming the discovery message is configured to: derive a discovery user scrambling key based on the key information; calculate a time hash value based on the discovery user scrambling key and a time of the discovery message; and perform an XOR operation on the discovery message and the time hash value to scramble the discovery message. In one configuration, the means for transforming the discovery message is further configured to: calculate a MIC for the discovery message using the key information; and add the MIC to the discovery message.

In one configuration, the means for transforming the discovery message is further configured to add message specific confidentiality to the discovery message using the key information. In one configuration, the means for transforming the discovery message is further configured to calculate a MIC for the discovery message using the key information; and add the MIC to the discovery message.

In one configuration, to add message specific confidentiality, the means for transforming the discovery message is further configured to: receive an encrypted bits mask; and calculate a key calculation mask as a logical complement of the encrypted bits mask. In one configuration, to add message specific confidentiality, the means for transforming the discovery message is further configured to: calculate a key stream based on the key information, a logical conjunction of the discovery message with the MIC added and a key calculation mask and a time of the discovery message; and perform an XOR operation on the discovery message and a logical conjunction of the key stream and an encrypted bits mask to update the discovery message. In one configuration, to calculate the MIC, the means for transforming the discovery message is further configured to: calculate a discovery user integrity key based on the key information; and compute the MIC based on the discovery user integrity key and a time of the discovery message.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
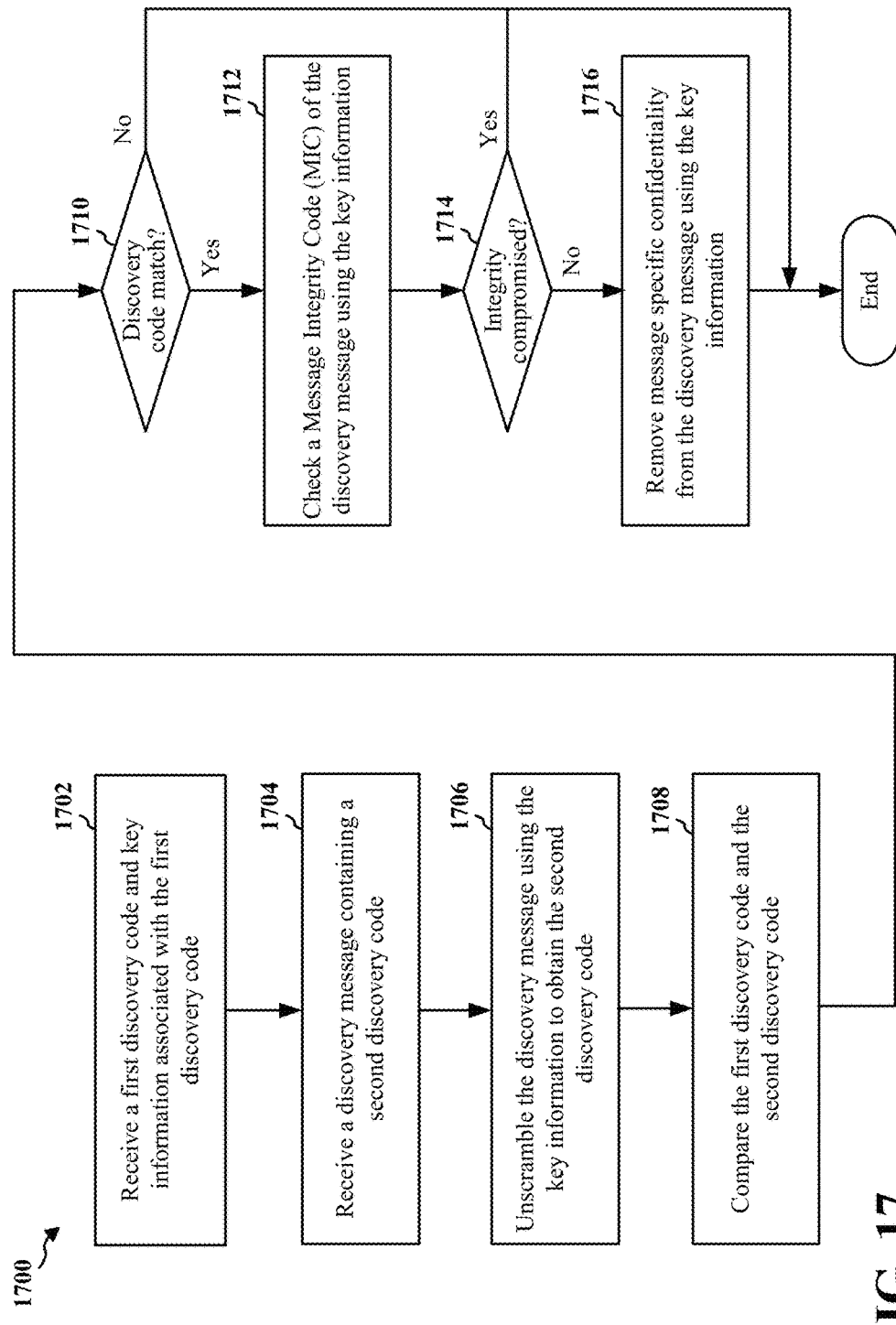
FIG. 17 is a flowchart of a method of wireless communication.

FIG. 17 is a flowchart 1700 of a method of wireless communication. The method may be performed by a monitoring UE. At 1702, the UE receives a first discovery code and key information associated with the first discovery code. At 1704, the UE receives a discovery message containing a second discovery code. In one configuration, the discovery message is received from an announcing UE. In one configuration, the first and second discovery codes are ProSe codes, each of which includes a prefix portion and a suffix portion, as described in FIG. 5 above.

At 1706, the UE unscrambles the discovery message using the key information to obtain the second discovery code. In one configuration, details of the operations at 1706 are described in FIG. 12 above.

At 1708, the UE compares the first discovery code and the second discovery code. At 1710, the UE determines whether the first and second discovery codes match. If the two discovery codes do not match, the method ends. However, if the two discovery codes match, the method proceeds to 1712.

At 1712, the UE checks a MIC of the discovery message using the received key information. In one configuration, details of the operations at 1712 are further described in FIG. 18 below. At 1714, the UE determines whether the integrity of the discovery message is compromised. If the integrity is compromised, the method ends. If the integrity is intact, the method proceeds to 1716.

At 1716, the UE removes message specific confidentiality from the discovery message using the received key information. In one configuration, details of the operations at 1716 are described in FIG. 13 above.

In one configuration, operations at 1712 are performed before operations at 1716. In another configuration, operations at 1716 are performed before operations at 1712. In one configuration, the order of operations at 1712 and 1716 is a reversed order of the confidentiality and integrity are added when the discovery message is generated by an announcing UE. In one configuration, operations at 1712 and 1714 may be omitted. In another configuration, operations at 1716 may be omitted. In yet another configuration, operations at 1712-1716 may be omitted.

Figure 18:
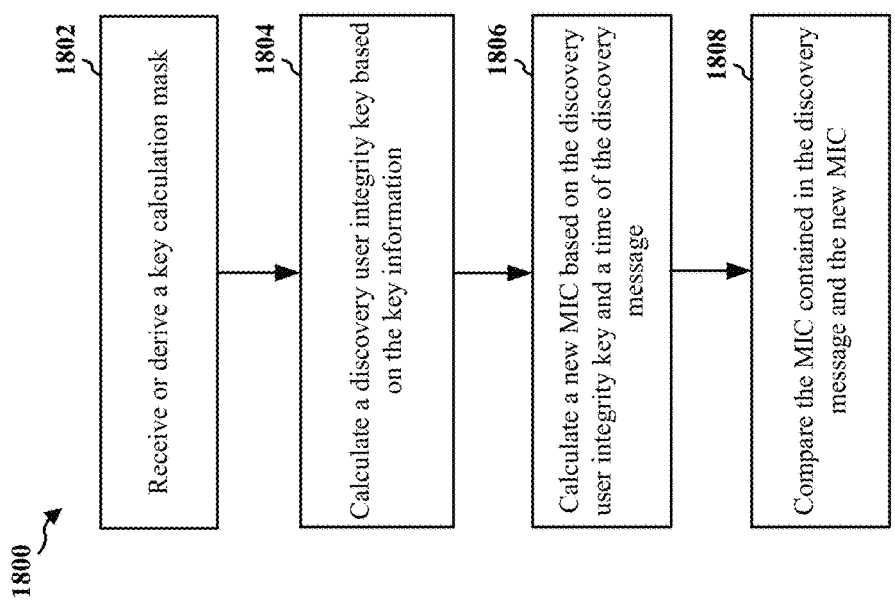
FIG. 18 is a flowchart of a method of wireless communication.

FIG. 18 is a flowchart 1800 of a method of wireless communication. The method may be performed by a monitoring UE. In one configuration, the method performs operations described in 1712 of FIG. 17 above. In one configuration, the method performs operations described in FIG. 9 above. At 1802, the UE receives a key calculation mask from a network server, or derives the key calculation mask from a encrypted bits mask received from the network server.

At 1804, the UE calculates a DUIK based on the key information. In one configuration, the input discovery message at 1804 is the output discovery message of operations at 1708 of FIG. 17 above. In another configuration, the input discovery message at 1804 is the output discovery message of operation at 1716 of FIG. 17 above. In one configuration, the DUIK is calculated based on the key information and a logical conjunction of the discovery message and the key calculation mask. In one configuration, the DUIK is calculated based on the key information and a logical conjunction of the discovery message with a temporary all zero MIC added and the key calculation mask.

At 1806, the UE calculates a new MIC based on the DUIK and a time of the discovery message. At 1808, the UE compares the MIC contained in the discovery message and the new MIC. If the two MICs are the same, the integrity of the discovery message is intact. Otherwise, the integrity of the discovery message is compromised.

Figure 19:
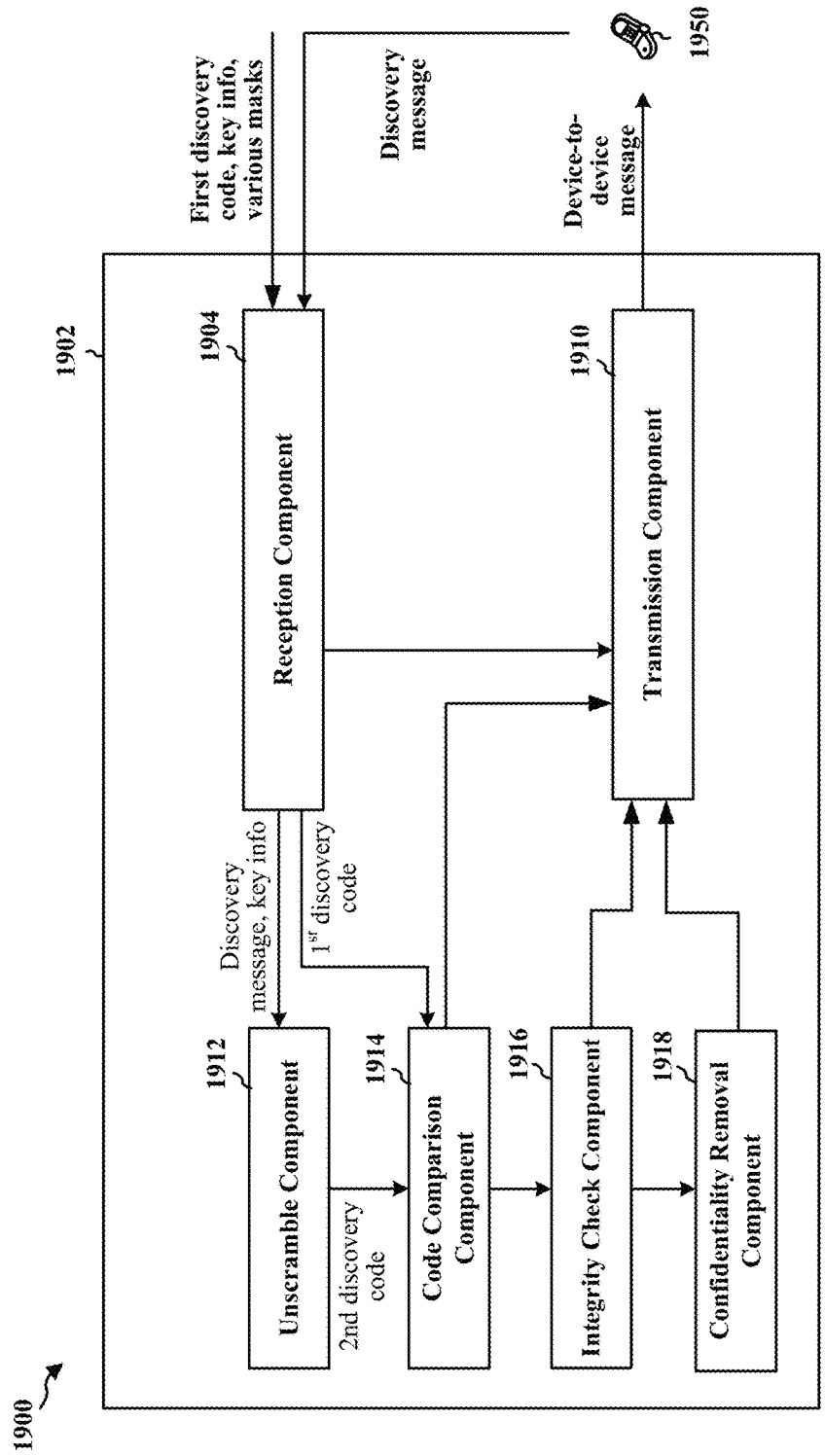
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus may be a monitoring UE. The apparatus 1902 includes a transmission component 1910 that is to transmit device-to-device messages to a UE 1950 or other UEs (not shown). The apparatus 1902 also includes a reception component 1904 that is to receive discovery messages from the UE 1950 and other announcing UEs (not shown). The reception component 1904 is also to receive a first discovery code, key information, and various masks from the network server.

The apparatus 1902 may include a unscramble component 1912 that unscrambles the discovery message using the key information to obtain a second discovery code. In one configuration, the unscramble component 1912 may perform operations described above with reference to FIG. 12 or 1706 of FIG. 17.

The apparatus 1902 may include a code comparison component 1914 that compares the first discovery code and the second discovery code. In one configuration, the code comparison component 1914 may perform operations described above with reference to 1708 of FIG. 17.

The apparatus 1902 may include an integrity check component 1916 that checks a MIC of the discovery message using the key information. In one configuration, the integrity check component 1916 may perform operations described above with reference to FIG. 18 or 1712 of FIG. 17.

The apparatus 1902 may include a confidentiality removal component 1918 that removes message specific confidentiality from the discovery message using the key information. In one configuration, the confidentiality removal component 1918 may perform operations described above with reference to FIG. 13 or 1716 of FIG. 17.

The apparatus may include additional components that perform each of the blocks of the algorithm in the aforementioned flowcharts of FIGS. 12-13 and 17-18. As such, each block in the aforementioned flowcharts of FIGS. 12-13 and 17-18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
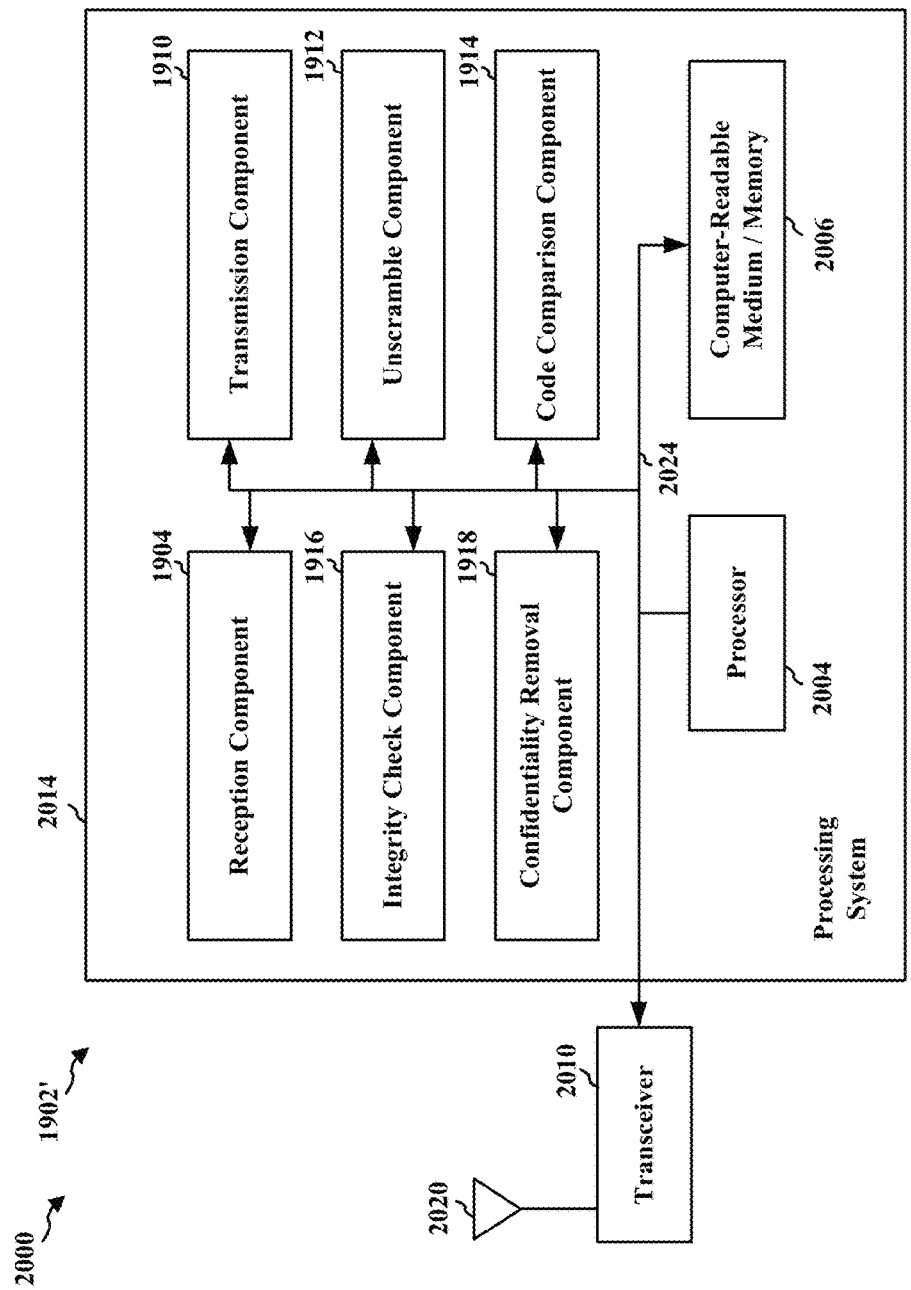
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1910, 1912, 1914, 1916, 1918, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the components 1904, 1910, 1912, 1914, 1916, and 1918. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for receiving a first discovery code and key information associated with the first discovery code, means for receiving a discovery message containing a second discovery code, means for unscrambling the discovery message using the key information to obtain the second discovery code, and means for comparing the first discovery code and the second discovery code.

In one configuration, the means for comparing the first discovery code and the second discovery code is configured to compare the prefix portion of the first discovery code and the prefix portion of the second discovery code. In one configuration, the means for unscrambling the discovery message is configured to: derive a discovery user scrambling key based on the key information; calculate a time hash value based on the discovery user scrambling key and a time of the discovery message; and perform an XOR operation on the discovery message and the time hash value to unscramble the discovery message.

In one configuration, the apparatus 1902/1902' further comprises means for checking a first MIC of the discovery message using the key information. In one configuration, the means for checking the first MIC is configured to: calculate a discovery user integrity key based on the key information; calculate a second MIC based on the discovery user integrity key and a time of the discovery message; and compare the first MIC and the second MIC.

In one configuration, the apparatus 1902/1902' further comprises means for removing message specific confidentiality from the discovery message using the key information. In one configuration, the means for removing message specific confidentiality is configured to: calculate a key stream based on the key information, a logical conjunction of the discovery message with a Message Integrity Code (MIC) added and a key calculation mask and a time of the discovery message; and perform an XOR operation on the discovery message and a logical conjunction of the key stream and an encrypted bits mask to recover the discovery message. In one configuration, the means for removing message specific confidentiality is configured to: receive an encrypted bits mask; and calculate a key calculation mask as a logical complement of the encrypted bits mask.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "component," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving a discovery code;
   generating a discovery message based on the discovery code, the discovery message having a structure that allows partial matching of the discovery code;

receiving key information associated with the discovery code;

transforming the discovery message using the key information; and broadcasting the transformed discovery message.

2. The method of claim 1, wherein the discovery code comprises a proximity services (ProSe) code.

3. The method of claim 2, wherein the ProSe code comprises a prefix portion and a suffix portion.

4. The method of claim 1, wherein the transforming of the discovery message comprises scrambling the discovery message using the key information.

5. The method of claim 4, wherein the scrambling of the discovery message comprises:

deriving a discovery user scrambling key based on the key information;

calculating a time hash value based on the discovery user scrambling key and a time of the discovery message; and performing an XOR operation on the discovery message and the time hash value to scramble the discovery message.

6. The method of claim 4, wherein the transforming of the discovery message further comprises:

calculating a Message Integrity Code (MIC) for the discovery message using the key information; and adding the MIC to the discovery message.

7. The method of claim 4, wherein the transforming of the discovery message further comprises adding message specific confidentiality to the discovery message using the key information.

8. The method of claim 7, wherein the transforming of the discovery message further comprises:

calculating a Message Integrity Code (MIC) for the discovery message using the key information; and adding the MIC to the discovery message.

9. The method of claim 7, wherein the adding of message specific confidentiality comprises:

receiving an encrypted bits mask; and calculating a key calculation mask as a logical complement of the encrypted bits mask.

10. The method of claim 7, wherein the adding of message specific confidentiality comprises:

calculating a key stream based on the key information, a logical conjunction of the discovery message with the MIC added and a key calculation mask and a time of the discovery message; and performing an XOR operation on the discovery message and a logical conjunction of the key stream and an encrypted bits mask to update the discovery message.

11. The method of claim 6, wherein the calculating of the MIC comprises:

calculating a discovery user integrity key based on the key information; and computing the MIC based on the discovery user integrity key and a time of the discovery message.

12. A method of wireless communication for a user equipment (UE), comprising:

receiving a first discovery code;

receiving a discovery message containing a second discovery code, the discovery message having a structure that allows partial matching of the first discovery code or the second discovery code;

receiving key information associated with the first discovery code;

unscrambling the discovery message using the key information to obtain the second discovery code; and comparing the first discovery code and the second discovery code.

13. The method of claim 12, wherein each of the first and second discovery code comprises a proximity services (ProSe) code.

14. The method of claim 13, wherein the ProSe code comprises a prefix portion and a suffix portion.

15. The method of claim 14, wherein the comparing of the first discovery code and the second discovery code comprises comparing the prefix portion of the first discovery code and the prefix portion of the second discovery code.

16. The method of claim 12, wherein the unscrambling of the discovery message comprises:

deriving a discovery user scrambling key based on the key information;

calculating a time hash value based on the discovery user scrambling key and a time of the discovery message; and performing an XOR operation on the discovery message and the time hash value to unscramble the discovery message.

17. The method of claim 12, wherein, in response to a comparison match between the first discovery code and the second discovery code, the method further comprises checking a Message Integrity Code (MIC) of the discovery message using the key information.

18. The method of claim 17, wherein the MIC is a first MIC, wherein the checking of the first MIC comprises:

calculating a discovery user integrity key based on the key information;

calculating a second MIC based on the discovery user integrity key and a time of the discovery message; and comparing the first MIC and the second MIC.

19. The method of claim 12, wherein, in response to a comparison match between the first discovery code and the second discovery code, the method further comprises removing message specific confidentiality from the discovery message using the key information.

20. The method of claim 19, wherein the removing of message specific confidentiality comprises:

calculating a key stream based on the key information, a logical conjunction of the discovery message with a Message Integrity Code (MIC) added and a key calculation mask and a time of the discovery message; and performing an XOR operation on the discovery message and a logical conjunction of the key stream and an encrypted bits mask to recover the discovery message.

21. The method of claim 19, wherein the removing of message specific confidentiality comprises:

receiving an encrypted bits mask; and calculating a key calculation mask as a logical complement of the encrypted bits mask.

22. An apparatus for wireless communication, comprising:

means for receiving a discovery code;

means for generating a discovery message based on the discovery code, the discovery message having a structure that allows partial matching of the discovery code;

means for receiving key information associated with the discovery code;

means for transforming the discovery message using the key information; and means for broadcasting the transformed discovery message.

23. The apparatus of claim 22, wherein the discovery code comprises a proximity services (ProSe) code.

24. The apparatus of claim 23, wherein the ProSe code comprises a prefix portion and a suffix portion.

25. The apparatus of claim 22, wherein the means for transforming the discovery message is configured to scramble the discovery message using the key information.

26. The apparatus of claim 25, wherein, to scramble the discovery message, the means for transforming the discovery message is configured to:
derive a discovery user scrambling key based on the key information;
calculate a time hash value based on the discovery user scrambling key and a time of the discovery message; and
perform an XOR operation on the discovery message and the time hash value to scramble the discovery message.

27. The apparatus of claim 25, wherein the means for transforming the discovery message is further configured to:
calculate a Message Integrity Code (MIC) for the discovery message using the key information; and
add the MIC to the discovery message.

28. The apparatus of claim 25, wherein the means for transforming the discovery message is further configured to add message specific confidentiality to the discovery message using the key information.

29. The apparatus of claim 28, wherein the means for transforming the discovery message is further configured to:
calculate a Message Integrity Code (MIC) for the discovery message using the key information; and
add the MIC to the discovery message.

30. The apparatus of claim 28, wherein, to add message specific confidentiality, the means for transforming the discovery message is further configured to:
receive an encrypted bits mask; and
calculate a key calculation mask as a logical complement of the encrypted bits mask.

31. The apparatus of claim 28, wherein, to add message specific confidentiality, the means for transforming the discovery message is further configured to:
calculate a key stream based on the key information, a logical conjunction of the discovery message with the MIC added and a key calculation mask and a time of the discovery message; and
perform an XOR operation on the discovery message and a logical conjunction of the key stream and an encrypted bits mask to update the discovery message.

32. The apparatus of claim 27, wherein, to calculate the MIC, the means for transforming the discovery message is further configured to:
calculate a discovery user integrity key based on the key information; and
compute the MIC based on the discovery user integrity key and a time of the discovery message.

33. An apparatus for wireless communication, comprising:
means for receiving a first discovery code;
means for receiving a discovery message containing a second discovery code, the discovery message having a structure that allows partial matching of the first discovery code or the second discovery code;
means for receiving key information associated with the first discovery code;
means for unscrambling the discovery message using the key information to obtain the second discovery code; and
means for comparing the first discovery code and the second discovery code.

34. The apparatus of claim 33, wherein each of the first and second discovery code comprises a proximity services (ProSe) code.

35. The apparatus of claim 34, wherein the ProSe code comprises a prefix portion and a suffix portion.

36. The apparatus of claim 35, wherein the means for comparing the first discovery code and the second discovery code is configured to compare the prefix portion of the first discovery code and the prefix portion of the second discovery code.

37. The apparatus of claim 33, wherein the means for unscrambling the discovery message is configured to:
derive a discovery user scrambling key based on the key information;
calculate a time hash value based on the discovery user scrambling key and a time of the discovery message; and
perform an XOR operation on the discovery message and the time hash value to unscramble the discovery message.

38. The apparatus of claim 33, wherein, in response to a comparison match between the first discovery code and the second discovery code, the apparatus further comprises means for checking a Message Integrity Code (MIC) of the discovery message using the key information.

39. The apparatus of claim 38, wherein the MIC is a first MIC, wherein the means for checking the first MIC is configured to:
calculate a discovery user integrity key based on the key information;
calculate a second MIC based on the discovery user integrity key and a time of the discovery message; and
compare the first MIC and the second MIC.

40. The apparatus of claim 33, wherein, in response to a comparison match between the first discovery code and the second discovery code, the apparatus further comprises means for removing message specific confidentiality from the discovery message using the key information.

41. The apparatus of claim 40, wherein the means for removing message specific confidentiality is configured to:
calculate a key stream based on the key information, a logical conjunction of the discovery message with a Message Integrity Code (MIC) added and a key calculation mask and a time of the discovery message; and
perform an XOR operation on the discovery message and a logical conjunction of the key stream and an encrypted bits mask to recover the discovery message.

42. The apparatus of claim 40, wherein the means for removing message specific confidentiality is configured to:
receive an encrypted bits mask; and
calculate a key calculation mask as a logical complement of the encrypted bits mask.

43. An apparatus for wireless communication, comprising:
a memory; and
at least one processor coupled to the memory and configured to:
receive a discovery code;
generate a discovery message based on the discovery code, the discovery message having a structure that allows partial matching of the discovery code;
receive key information associated with the discovery code;
transform the discovery message using the key information; and
broadcast the transformed discovery message.

44. The apparatus of claim 43, wherein the discovery code comprises a proximity services (ProSe) code.

45. The apparatus of claim 44, wherein the ProSe code comprises a prefix portion and a suffix portion.

46. The apparatus of claim 43, wherein, to transform the discovery message, the at least one processor is configured to scramble the discovery message using the key information.

47. The apparatus of claim 46, wherein, to scramble the discovery message, the at least one processor is configured to:
derive a discovery user scrambling key based on the key information;
calculate a time hash value based on the discovery user scrambling key and a time of the discovery message; and
perform an XOR operation on the discovery message and the time hash value to scramble the discovery message.

48. The apparatus of claim 46, wherein, to transform the discovery message, the at least one processor is further configured to:
calculate a Message Integrity Code (MIC) for the discovery message using the key information; and
add the MIC to the discovery message.

49. The apparatus of claim 46, wherein, to transform the discovery message, the at least one processor is configured to add message specific confidentiality to the discovery message using the key information.

50. The apparatus of claim 49, wherein, to transform the discovery message, the at least one processor is further configured to:
calculate a Message Integrity Code (MIC) for the discovery message using the key information; and
add the MIC to the discovery message.

51. The apparatus of claim 49, wherein, to add message specific confidentiality, the at least one processor is configured to:
receive an encrypted bits mask; and
calculate a key calculation mask as a logical complement of the encrypted bits mask.

52. The apparatus of claim 49, wherein, to add message specific confidentiality, the at least one processor is configured to:
calculate a key stream based on the key information, a logical conjunction of the discovery message with the MIC added and a key calculation mask and a time of the discovery message; and
perform an XOR operation on the discovery message and a logical conjunction of the key stream and an encrypted bits mask to update the discovery message.

53. The apparatus of claim 48, wherein, to calculate the MIC, the at least one processor is configured to:
calculate a discovery user integrity key based on the key information; and
compute the MIC based on the discovery user integrity key and a time of the discovery message.

54. An apparatus for wireless communication, comprising:
a memory; and
at least one processor coupled to the memory and configured to:
receive a first discovery code;
receive a discovery message containing a second discovery code, the discovery message having a structure that allows partial matching of the first discovery code or the second discovery code;
receive key information associated with the first discovery code;
unscramble the discovery message using the key information to obtain the second discovery code; and
compare the first discovery code and the second discovery code.

55. The apparatus of claim 54, wherein each of the first and second discovery code comprises a proximity services (ProSe) code.

56. The apparatus of claim 55, wherein the ProSe code comprises a prefix portion and a suffix portion.

57. The apparatus of claim 56, wherein, to compare the first discovery code and the second discovery code, the at least one processor is configured to compare the prefix portion of the first discovery code and the prefix portion of the second discovery code.

58. The apparatus of claim 54, wherein, to unscramble the discovery message, the at least one processor is configured to:
derive a discovery user scrambling key based on the key information;
calculate a time hash value based on the discovery user scrambling key and a time of the discovery message; and
perform an XOR operation on the discovery message and the time hash value to unscramble the discovery message.

59. The apparatus of claim 54, wherein, in response to a comparison match between the first discovery code and the second discovery code, the at least one processor is further configured to check a Message Integrity Code (MIC) of the discovery message using the key information.

60. The apparatus of claim 59, wherein the MIC is a first MIC, wherein, to check the first MIC, the at least one processor is configured to:
calculate a discovery user integrity key based on the key information;
calculate a second MIC based on the discovery user integrity key and a time of the discovery message; and
compare the first MIC and the second MIC.

61. The apparatus of claim 54, wherein, in response to a comparison match between the first discovery code and the second discovery code, the at least one processor is further configured to remove message specific confidentiality from the discovery message using the key information.

62. The apparatus of claim 61, wherein, to remove message specific confidentiality, the at least one processor is configured to:
calculate a key stream based on the key information, a logical conjunction of the discovery message with a Message Integrity Code (MIC) added and a key calculation mask and a time of the discovery message; and
perform an XOR operation on the discovery message and a logical conjunction of the key stream and an encrypted bits mask to recover the discovery message.

63. The apparatus of claim 61, wherein, to remove message specific confidentiality, the at least one processor is configured to:
receive an encrypted bits mask; and
calculate a key calculation mask as a logical complement of the encrypted bits mask.

64. A non-transitory computer-readable medium storing computer executable code, comprising code to:
receive a discovery code;
generate a discovery message based on the discovery code, the discovery message having a structure that allows partial matching of the discovery code;

receive key information associated with the discovery code;

transform the discovery message using the key information; and broadcast the transformed discovery message.

65. A non-transitory computer-readable medium storing computer executable code, comprising code to:

receive a first discovery code;

receive a discovery message containing a second discovery code, the discovery message having a structure that allows partial matching of the first discovery code or the second discovery code;

receive key information associated with the first discovery code;

unscramble the discovery message using the key information to obtain the second discovery code; and compare the first discovery code and the second discovery code.

* * * * *